US012100381B2

(12) United States Patent
Tsuji et al.

(10) Patent No.: US 12,100,381 B2

(45) **Date of Patent: *Sep. 24, 2024**

(54) SIGNAL PROCESSING DEVICE, SIGNAL PROCESSING METHOD, AND PROGRAM

(71) Applicant: Sony Group Corporation, Tokyo (JP)

(72) Inventors: Minoru Tsuji, Chiba (JP); Toru Chinen, Kanagawa (JP); Takao Fukui, Tokyo (JP); Mitsuyuki Hatanaka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,892

(22) Filed: Jul. 25, 2023

(65) Prior Publication Data

US 2023/0368772 A1 Nov. 16, 2023

Related U.S. Application Data

(63) Continuation of application No. 17/585,247, filed on Jan. 26, 2022, now Pat. No. 11,749,252, which is a continuation of application No. 16/755,790, filed as application No. PCT/JP2018/037329 on Oct. 5, 2018, now Pat. No. 11,257,478.

(30) Foreign Application Priority Data

Oct. 20, 2017 (JP) ................................ 2017-203876

(51) Int. Cl.
*G10K 15/08* (2006.01)
*H04S 7/00* (2006.01)

(52) U.S. Cl.
CPC ................ *G10K 15/08* (2013.01); *H04S 7/30* (2013.01)

(58) Field of Classification Search
CPC ................................ H04S 7/30; G10K 15/08
USPC ................................................... 381/61, 63
See application file for complete search history.

(56) References Cited

U.S. PATENT DOCUMENTS

| | | | |
|---|---|---|---|
| 5,742,688 | A | 4/1998 | Ogawa |
| 11,109,179 | B2 | 8/2021 | Honma et al. |
| 11,257,478 | B2 | 2/2022 | Tsuji et al. |
| 2005/0179701 | A1 | 8/2005 | Jahnke |
| 2006/0045283 | A1 | 3/2006 | Lin et al. |

(Continued)

FOREIGN PATENT DOCUMENTS

| | | |
|---|---|---|
| CN | 101014209 A | 8/2007 |
| CN | 101034548 A | 9/2007 |

(Continued)

OTHER PUBLICATIONS

U.S. Appl. No. 17/400,010, filed Aug. 11, 2021, Honma et al.

(Continued)

*Primary Examiner* — David L Ton
(74) *Attorney, Agent, or Firm* — Wolf, Greenfield & Sacks, P.C.

(57) ABSTRACT

The present technology relates to a signal processing device, a signal processing method, and a program that enable implementation of more effective distance feeling control. The signal processing device includes a reverb processing unit that generates a signal of a reverb component on the basis of object audio data of an audio object and a reverb parameter for the audio object. The present technology can be applied to a signal processing device.

19 Claims, 31 Drawing Sheets

(56) References Cited

U.S. PATENT DOCUMENTS

| | | | |
|---|---|---|---|
| 2007/0140501 A1 | 6/2007 | Schmidt et al. | |
| 2012/0057715 A1 | 3/2012 | Johnston et al. | |
| 2012/0070005 A1 | 3/2012 | Inou et al. | |
| 2012/0082319 A1 | 4/2012 | Jot et al. | |
| 2013/0179575 A1 | 7/2013 | Young et al. | |
| 2015/0332663 A1 | 11/2015 | Jot et al. | |
| 2015/0373475 A1 | 12/2015 | Raghuvanshi et al. | |
| 2016/0125871 A1 | 5/2016 | Shiraakihara | |
| 2016/0198281 A1 | 7/2016 | Oh et al. | |
| 2016/0219388 A1 | 7/2016 | Oh et al. | |
| 2016/0234620 A1 | 8/2016 | Lee et al. | |
| 2016/0249149 A1 | 8/2016 | Oh et al. | |
| 2018/0227692 A1 | 8/2018 | Lee et al. | |
| 2019/0253825 A1* | 8/2019 | Tsuji | H04S 7/302 |
| 2020/0327879 A1 | 10/2020 | Tsuji et al. | |
| 2021/0195363 A1 | 6/2021 | Honma et al. | |
| 2021/0377691 A1 | 12/2021 | Honma et al. | |
| 2022/0148560 A1 | 5/2022 | Tsuji et al. | |
| 2023/0126927 A1 | 4/2023 | Honma et al. | |

FOREIGN PATENT DOCUMENTS

| | | | |
|---|---|---|---|
| CN | 103402169 | A | 11/2013 |
| CN | 103430574 | A | 12/2013 |
| CN | 105519139 | A | 4/2016 |
| CN | 105659630 | A | 6/2016 |
| CN | 105706467 | A | 6/2016 |
| CN | 105792090 | A | 7/2016 |
| EP | 36337 | A2 | 9/1981 |
| EP | 0 480 561 | A3 | 9/1992 |
| EP | 2 840 811 | A1 | 2/2015 |
| EP | 3048814 | A1 | 7/2016 |
| EP | 3048815 | A1 | 7/2016 |
| EP | 3048816 | A1 | 7/2016 |
| EP | 3 096 539 | A1 | 11/2016 |
| EP | 3 209 002 | A1 | 8/2017 |
| EP | 3 407 573 | A1 | 11/2018 |
| FR | 2554615 | A1 | 5/1985 |
| JP | S61237600 | A | 10/1986 |
| JP | 2007-513370 | A | 5/2007 |
| JP | 2008-311718 | A | 12/2008 |
| JP | 2013-541275 | A | 11/2013 |
| JP | 2016-534586 | A | 11/2016 |
| KR | 101627652 | B1 | 6/2016 |
| KR | 20160094348 | A | 8/2016 |
| KR | 20160108325 | A | 9/2016 |
| RU | 2403674 | C2 | 11/2010 |
| WO | WO 2005/055193 | A1 | 6/2005 |
| WO | WO 2011/008705 | A1 | 1/2011 |
| WO | WO 2012/033950 | A1 | 3/2012 |
| WO | WO 2015/107926 | A1 | 7/2015 |
| WO | WO-2015152661 | A1 | 10/2015 |
| WO | WO 2017/043309 | A1 | 3/2017 |

OTHER PUBLICATIONS

U.S. Appl. No. 17/585,247, filed Jan. 26, 2022, Tsuji et al.

U.S. Appl. No. 18/088,002, filed Dec. 23, 2022, Honma et al.

Extended European Search Report dated Nov. 27, 2020 in connection with European Application No. 18868539.0.

Extended European Search Report dated Nov. 19, 2020 in connection with European Application No. 18869347.7.

International Search Report and English translation thereof mailed Dec. 18, 2018 in connection with International Application No. PCT/JP2018/037330.

International Search Report and English translation thereof mailed Dec. 18, 2018 in connection with International Application No. PCT/JP2018/037329.

International Written Opinion and English translation thereof mailed Dec. 18, 2018 in connection with International Application No. PCT/JP2018/037330.

International Written Opinion and English translation thereof mailed Dec. 18, 2018 in connection with International Application No. PCT/JP2018/037329.

International Preliminary Report on Patentability and English translation thereof mailed Apr. 30, 2020 in connection with International Application No. PCT/JP2018/037330.

International Preliminary Report on Patentability and English translation thereof mailed Apr. 30, 2020 in connection with International Application No. PCT/JP2018/037329.

[No Author Listed], International Standard ISO/IEC 23008-3. Information technology—High efficiency coding and media delivery in heterogeneous environments—Part 3: 3D audio. Feb. 1, 2016. 439 pages.

Coleman et al., Object-based reverberation for spatial audio. Journal of the Audio Engineering Society. Feb. 16, 2017;65(1/2):66-77.

Lee et al., An Object-based 3D Audio Broadcasting System for Interactive Service. Audio Engineering Society (AES) Convention Paper 6384. May 28-31, 2005, pp. 1-8, XP002577516. Retrieved from the Internet: URL:http://www.aes.org/tmpFiles/elib/20100413/13100. pdf [retrieved on Apr. 12, 2010].

Pulkki, Virtual Sound Source Positioning Using Vector Base Amplitude Panning. J. Audio Eng. Soc. 1997;45(6):456-466.

Chen, Junhai, "The foundation of sound production", China Light Industry Press, pp. 10-11, Aug. 2015.

* cited by examiner

FIG. 2

| REVERB PARAMETER EXAMPLE |
| --- |
| Dry GAIN |
| Wet GAIN |
| REVERBERATION TIME |
| PRE-DELAY DELAY TIME |
| PRE-DELAY GAIN |
| EARLY REFLECTION DELAY TIME |
| EARLY REFLECTION GAIN |
| Wet COMPONENT POSITION INFORMATION |

FIG. 3

| | Wet COMPONENT POSITION INFORMATION | |
|---|---|---|
| | HORIZONTAL ANGLE | PERPENDICULAR ANGLE |
| Wet COMPONENT 1 | Obj HORIZONTAL ANGLE+30 DEGREES | Obj PERPENDICULAR ANGLE+30 DEGREES |
| Wet COMPONENT 2 | Obj HORIZONTAL ANGLE−30 DEGREES | Obj PERPENDICULAR ANGLE+30 DEGREES |
| Wet COMPONENT 3 | Obj HORIZONTAL ANGLE+30 DEGREES | Obj PERPENDICULAR ANGLE−30 DEGREES |
| Wet COMPONENT 4 | Obj HORIZONTAL ANGLE−30 DEGREES | Obj PERPENDICULAR ANGLE−30 DEGREES |

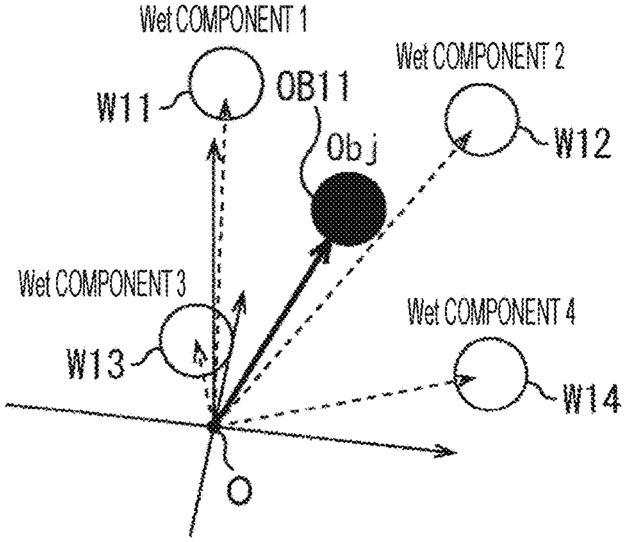

| | Wet COMPONENT POSITION INFORMATION | |
|---|---|---|
| | HORIZONTAL ANGLE | PERPENDICULAR ANGLE |
| Wet COMPONENT 1 | +45 DEGREES | 0 DEGREES |
| Wet COMPONENT 2 | -45 DEGREES | 0 DEGREES |
| Wet COMPONENT 3 | +135 DEGREES | 0 DEGREES |
| Wet COMPONENT 4 | -135 DEGREES | 0 DEGREES |

FIG. 7

| Syntax | No. of bytes | Data format |
|---|---|---|
| Reverb_Metadata() { | | |
| **dry_gain** | 4 | float |
| **wet_position_mode** | 1 | unsigned char |
| **number_of_wet_outputs** | 4 | unsigned int |
| for (i = 0; i < number_of_wet_outputs; i++) { | | |
| wet_gain[i] | 4 | float |
| if (wet_position_mode == 0) { | | |
| **wet_position_azimuth_offset[i]** | 4 | float |
| **wet_position_elevation_offset[i]** | 4 | float |
| } | | |
| else { | | |
| **wet_position_azimuth[i]** | 4 | float |
| **wet_position_elevation[i]** | 4 | float |
| } | | |
| **number_of_taps[i]** | 4 | unsigned int |
| for (j = 0; j < number_of_taps[i]; j++) { | | |
| **coef[i][j]** | 4 | float |
| } | | |
| } | | |

FIG. 10

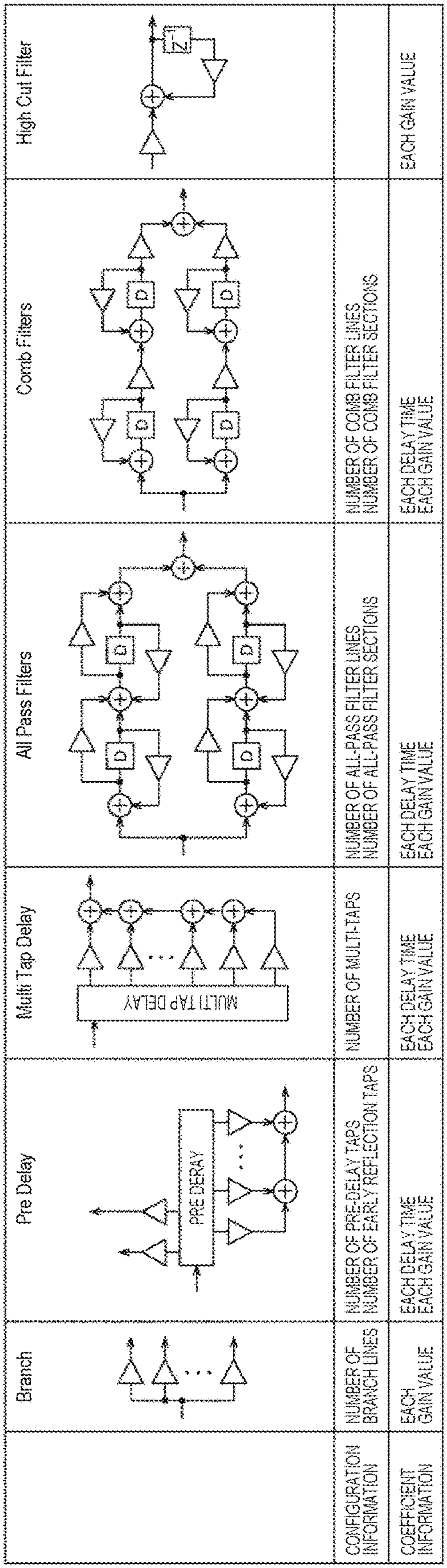

| | Branch | Pre Delay | Multi Tap Delay | All Pass Filters | Comb Filters | High Cut Filter |
|---|---|---|---|---|---|---|
| CONFIGURATION INFORMATION | NUMBER OF BRANCH LINES | NUMBER OF PRE-DELAY TAPS<br>NUMBER OF EARLY REFLECTION TAPS | NUMBER OF MULTI-TAPS | NUMBER OF ALL-PASS FILTER LINES<br>NUMBER OF ALL-PASS FILTER SECTIONS | NUMBER OF COMB FILTER LINES<br>NUMBER OF COMB FILTER SECTIONS | |
| COEFFICIENT INFORMATION | EACH GAIN VALUE | EACH DELAY TIME<br>EACH GAIN VALUE | EACH DELAY TIME<br>EACH GAIN VALUE | EACH DELAY TIME<br>EACH GAIN VALUE | EACH DELAY TIME<br>EACH GAIN VALUE | EACH GAIN VALUE |

FIG. 11

| Syntax | No. of bytes | Data format |
|---|---|---|
| Reverb_Metadata() { | | |
| Reverb_Configuration() | | |
| Reverb_Parameter(0) | | |
| } | | |

FIG. 12

| Syntax | No. of bytes | Data format |
|---|---|---|
| Reverb_Configuration() { | | |
| **wet_position_mode** | 1 | unsigned char |
| **number_of_wet_outputs** | 4 | unsigned int |
| for (i = 0; i < number_of_wet_outputs; i++) { | | |
| if (wet_position_mode == 0) { | | |
| **wet_position_azimuth_offset[i]** | 4 | float |
| **wet_position_elevation_offset[i]** | 4 | float |
| } | | |
| else { | | |
| **wet_position_azimuth[i]** | 4 | float |
| **wet_position_elevation[i]** | 4 | float |
| } | | |
| } | | |
| Reverb_Structure(0); | | |
| } | | |

FIG. 13

| Syntax | No. of bytes | Data format |
|---|---|---|
| Reverb_Structure(n) { | | |
| while (**elem_id[n]** != TERM && elem_id[n] != OUTPUT) { | 1 | unsigned int |
| switch (elem_id[n]) { | | |
| case BRANCH: | | |
| Branch_Configuration(n); | | |
| case PRE_DELAY: | | |
| PreDelay_Configuration(); | | |
| break; | | |
| case MULTI_TAP_DELAY: | | |
| MultiTapDelay_Configuration(); | | |
| break; | | |
| case ALL_PASS_FILTER: | | |
| AllPassFilter_Configuration(); | | |
| break; | | |
| case COMB_FILTER: | | |
| CombFilter_Configuration(); | | |
| break; | | |
| case HIGH_CUT: | | |
| HighCut_Configuration(); | | |
| break; | | |
| } | | |
| n++; | | |
| } | | |
| } | | |

FIG. 14

| Syntax | No. of bytes | Data format |
|---|---|---|
| Branch_Configuration(n) { | | |
| **number_of_lines** | 1 | unsigned int |
| for (i = 0; i < number_of_lines; i++) { | | |
| n++; | | |
| Reverb_Structure(n) | 4 | float |
| } | | |
| } | | |

FIG. 15

| Syntax | No. of bytes | Data format |
|---|---|---|
| PreDelay_Configuration() { | | |
| number_of_predelays | 1 | unsigned int |
| number_of_earlyreflections | 1 | unsigned int |
| } | | |

FIG. 16

| Syntax | No. of bytes | Data format |
|---|---|---|
| MultiTapDelay_Configuration() { | | |
| number_of_taps | 1 | unsigned int |
| } | | |

FIG. 17

| Syntax | No. of bytes | Data format |
|---|---|---|
| AllPassFilter_Configuration() { | | |
| number_of_apf_lines | 1 | unsigned int |
| number_of_apf_sections | 1 | unsigned int |
| } | | |

FIG. 18

| Syntax | No. of bytes | Data format |
|---|---|---|
| CombFilter_Configuration() { | | |
| number_of_comb_lines | 1 | unsigned int |
| number_of_comb_sections | 1 | unsigned int |
| } | | |

FIG. 19

| Syntax | No. of bytes | Data format |
|---|---|---|
| HighCut_Configuration() {<br>} | | |

FIG. 20

| Syntax | No. of bytes | Data format |
| --- | --- | --- |
| Reverb_Parameters (n) {<br>while (elem_id[n++]* != TERM && elem_id[n] != OUTPUT)<br>{<br>switch (elem_id) {<br>case BRANCH:<br>Branch_Parameters(n);<br>break;<br>case PRE_DELAY:<br>PreDelay_Parameters();<br>break;<br>case MULTI_TAP_DELAY:<br>MultiTapDelay_Parameters();<br>break;<br>case ALL_PASS_FILTER:<br>AllPassFilter_Parameters();<br>break;<br>case COMB_FILTER:<br>CombFilter_Parameters();<br>break;<br>case HIGH_CUT:<br>HighCut_Parameters();<br>break;<br>}<br>} | | |

* known from the preceding Reverb_Configuration()

FIG. 21

| Syntax | No. of bytes | Data format |
| --- | --- | --- |
| Branch_Parameters() {<br>  for (i = 0; i < number_of_lines*; i++) {<br>    **gain[i]**<br>    n++;<br>    Reverb_Paramters(n)<br>  }<br>} | 4 | float |

* known from the preceding Branch_Configuration()

FIG. 22

| Syntax | No. of bytes | Data format |
|---|---|---|
| PreDelay_Parameters() { | | |
|   for (i = 0; i < number_of_predelays*; i++) { | | |
|     **predelay_sample[i]** | 4 | unsigned int |
|     **predelay_gain[i]** | 4 | float |
|   } | | |
|   for (i = 0; i < number_of_earlyreflections*; i++) { | | |
|     **earlyref_sample[i]** | 4 | unsigned int |
|     **earlyref_gain[i]** | 4 | float |
|   } | | |
| } | | |

* known from the preceding PreDelay_Configuration()

FIG. 23

| Syntax | No. of bytes | Data format |
|---|---|---|
| MultiTapDelay_Parameters() { | | |
| for (i = 0; i < number_of_taps*; i++) { | | |
| **delay_sample[i]** | 4 | unsigned int |
| **delay_gain[i]** | 4 | float |
| } | | |
| } | | |

* known from the preceding MultiTapDelay_Configuration()

FIG. 24

| Syntax | No. of bytes | Data format |
|---|---|---|
| HighCut_Parameters() { | | |
| gain | 4 | float |
| } | | |

FIG. 25

| Syntax | No. of bytes | Data format |
|---|---|---|
| AllPassFilter_Parameters() { | | |
|   for (i = 0, i < number_of_apf_lines*; i++) { | | |
|     for (j = 0, j < number_of_apf_sections*; j++) { | | |
|       **delay_sample[i][j]** | 4 | unsigned int |
|       **gain[i][j]** | 4 | float |
|     } | | |
|   } | | |
| } | | |

* known from the preceding AllPassFilter_Configuration()

FIG. 26

| Syntax | No. of bytes | Data format |
|---|---|---|
| CombFilter_Parameters() { | | |
|   for (i = 0, i < number_of_comb_lines*; i++) { | | |
|     for (j = 0, j < number_of_comb_sections*; j++) { | | |
|       **delay_sample[i][j]** | 4 | unsigned int |
|       **gain_a[i][j]** | 4 | float |
|       **gain_b[i][j]** | 4 | float |
|     } | | |
|   } | | |
| } | | |

* known from the preceding CombFilter_Configuration()

FIG. 27

| Syntax | Value |
|---|---|
| Reverb_Metadata() { | |
| /* Reverb_Configuration() */ | 0 |
| **wet_position_mode** | 0 |
| **number_of_wet_outputs** | |
| /* Reverb_Structure(0) */ | |
| elem_id[0] | BRANCH(=0) |
| /* Branch_Configuration() */ | |
| **number_of_lines** | 2 |
| /* Reverb_Structure(1) */ | |
| elem_id[1] | TERM(=6) |
| /* Reverb_Structure(2) */ | |
| elem_id[2] | PRE_DELAY(=1) |
| /* PreDelay_Configuration() */ | |
| **number_of_predelays** | 3 |
| **number_of_earlyreflections** | 2 |
| elem_id[3] | COMB_FILTER(=4) |
| /* CombFilter_Configuration() */ | |
| **number_of_comb_lines** | 3 |
| **number_of_comb_sections** | 1 |
| /* AllPassFilter_Configuration() */ | |
| elem_id[4] | ALL_PASS_FILTER(=2) |
| **number_of_apf_lines** | 1 |
| **number_of_apf_sections** | 2 |
| elem_id[5] | OUTPUT(=7) |
| | |
| /* Reverb_Parameter(0) */ | |
| /* Branch Parameter(0) */ | |
| **gain[0]** | X.X |
| /* Reverb_Parameter(1) */ | |
| **gain[1]** | X.X |
| /* PreDelay_Parameters() */ | |
| **predelay_sample[0]** | X |
| **predelay_gain[0]** | X.X |
| **predelay_sample[1]** | X |
| **predelay_gain[1]** | X.X |
| **predelay_sample[2]** | X |
| **predelay_gain[2]** | X.X |
| **earlyref_sample[0]** | X |
| **earlyref_gain[0]** | X.X |
| **earlyref_sample[1]** | X |
| **earlyref_gain[1]** | X.X |
| /* CombFilter_Parameters() */ | |
| **delay_sample[0][0]** | X |
| **gain_a[0][0]** | X.X |
| **gain_b[0][0]** | X.X |
| **delay_sample[1][0]** | X |
| **gain_a[1][0]** | X.X |
| **gain_b[1][0]** | X.X |
| **delay_sample[2][0]** | X |
| **gain_a[2][0]** | X.X |
| **gain_b[2][0]** | X.X |
| /* AllPassFilter_Parameters() */ | |
| **delay_sample[0][0]** | X |
| **gain[0][0]** | X.X |
| **delay_sample[0][1]** | X |
| **gain[0][1]** | X.X |
| } | |

FIG. 30

| Syntax | Value |
|---|---|
| Reverb_Metadata() { | |
| /* Reverb_Configuration() */ | 0 |
| **wet_position_mode** | 0 |
| **number_of_wet_outputs** | |
| /* Reverb_Structure(0) */ | |
| elem_id[0] | BRANCH(=0) |
| /* Branch_Configuration() */ | |
| **number_of_lines** | 2 |
| /* Reverb_Structure(1) */ | |
| elem_id[1] | TERM(=6) |
| /* Reverb_Structure(2) */ | |
| elem_id[2] | PRE_DELAY(=1) |
| /* PreDelay_Configuration() */ | |
| **number_of_predelays** | 2 |
| **number_of_earlyreflections** | 2 |
| elem_id[3] | MULTI_TAP_DELAY(=3) |
| /* MultiTapDelay_Configuration() */ | |
| **number_of_taps** | 5 |
| /* AllPassFilter_Configuration() */ | |
| elem_id[4] | ALL_PASS_FILTER(=2) |
| **number_of_apf_lines** | 2 |
| **number_of_apf_sections** | 2 |
| elem_id[5] | OUTPUT(=7) |
| | |
| /* Reverb_Parameter(0) */ | |
| /* Branch Parameter(0) */ | |
| **gain[0]** | X.X |
| /* Reverb_Parameter(1) */ | |
| **gain[1]** | X.X |
| /* PreDelay_Parameters() */ | |
| **predelay_sample[0]** | X |
| **predelay_gain[0]** | X.X |
| **predelay_sample[1]** | X |
| **predelay_gain[1]** | X.X |
| **earlyref_sample[0]** | X |
| **earlyref_gain[0]** | X.X |
| **earlyref_sample[1]** | X |
| **earlyref_gain[1]** | X.X |
| /* Multi_Tap_Delay_Parameters() */ | |
| **delay_sample[0]** | X |
| **delay_gain[0]** | X.X |
| **delay_sample[1]** | X |
| **delay_gain[1]** | X.X |
| **delay_sample[2]** | X |
| **delay_gain[2]** | X.X |
| **delay_sample[3]** | X |
| **delay_gain[3]** | X.X |
| **delay_sample[4]** | X |
| **delay_gain[4]** | X.X |
| /* AllPassFilter_Parameters() */ | |
| **delay_sample[0][0]** | X |
| **gain[0][0]** | X.X |
| **delay_sample[0][1]** | X |
| **gain[0][1]** | X.X |
| **delay_sample[1][0]** | X |
| **gain[1][0]** | X.X |
| **delay_sample[1][1]** | X |
| **gain[1][1]** | X.X |
| } | |

SIGNAL PROCESSING DEVICE, SIGNAL PROCESSING METHOD, AND PROGRAM

CROSS-REFERENCE TO RELATED APPLICATIONS

The present application claims the benefit under 35 U.S.C. § 120 as a continuation application of U.S. Application No. 17/585,247, filed on Jan. 26, 2022, now U.S. Pat. No. 11,749,252, which claims the benefit under 35 U.S.C. § 120 as a continuation application of U.S. Application No. 16/755,790, filed on Apr. 13, 2020, now U.S. Pat. No. 11,257,478, which claims the benefit under 35 U.S.C. § 371 as a U.S. National Stage Entry of International Application No. PCT/JP2018/037329, filed in the Japanese Patent Office as a Receiving Office on Oct. 5, 2018, which claims priority to Japanese Patent Application Number JP 2017-203876, filed in the Japanese Patent Office on Oct. 20, 2017, each of which applications is hereby incorporated by reference in its entirety.

TECHNICAL FIELD

The present technology relates to a signal processing device, a signal processing method, and a program, in particular, to a signal processing device, a signal processing method, and a program that enable implementation of more effective distance feeling control.

BACKGROUND ART

In recent years, object-based audio technology has been attracting attention.

In object-based audio, audio data is configured by a waveform signal with respect to an object and metadata indicating localization information of the object represented by a relative position from a viewing/listening point as a predetermined reference.

Then, a waveform signal of the object is rendered into signals of a desired number of channels by, for example, vector based amplitude panning (VBAP) on the basis of the metadata and reproduced (for example, see Non-Patent Document 1 and Non-Patent Document 2).

CITATION LIST

Non-Patent Document

Non-Patent Document 1: ISO/IEC 23008-3 Information technology-High efficiency coding and media delivery in heterogeneous environments-Part 3: 3D audio Non-Patent Document 2: Ville Pulkki, "Virtual Sound Source Positioning Using Vector Base Amplitude Panning", Journal of AES, vol. 45, no. 6, pp. 456-466, 1997

SUMMARY OF THE INVENTION

Problems to be Solved by the Invention

With the above-described method, in rendering of the object-based audio, it is possible to arrange each object in various directions in three-dimensional space and localize sound.

However, it has been difficult to effectively implement distance feeling control of an audio object. That is, for example, in a case where it is desired to create a front-rear distance feeling when reproducing sound of the object, the distance feeling has to be produced by gain control or frequency characteristic control, and a sufficient effect has not been able to be obtained. Furthermore, although a waveform signal previously processed to have a sound quality that creates a distance feeling can be used, in such a case, the distance feeling cannot be controlled on a reproduction side.

The present technology has been developed to solve such problems described above, and is to implement distance feeling control more effectively.

Solutions to Problems

A signal processing device according to one aspect of the present technology includes a reverb processing unit that generates a signal of a reverb component on the basis of object audio data of an audio object and a reverb parameter for the audio object.

A signal processing method or a program according to one aspect of the present technology includes a step of generating a signal of a reverb component on the basis of object audio data of an audio object and a reverb parameter for the audio object.

In one aspect of the present technology, a signal of a reverb component is generated on the basis of object audio data of an audio object and a reverb parameter for the audio object.

Effects of the Invention

According to one aspect of the present technology, it is possible to implement distance feeling control more effectively.

Note that the effects described here are not necessarily limited, and may be any of the effects described in the present disclosure.

BRIEF DESCRIPTION OF DRAWINGS

FIG. 2 is a diagram illustrating an example of a reverb parameter.

FIG. 3 is a diagram describing Wet component position information and sound image localization of Wet components.

FIG. 7 is a diagram illustrating a syntax example of meta information.

FIG. 10 is a diagram describing configuration elements of parametric reverb.

FIG. 11 is a diagram illustrating a syntax example of meta information.

FIG. 12 is a diagram illustrating a syntax example of Reverb_Configuration( ).

FIG. 13 is a diagram illustrating a syntax example of Reverb_Structure( ).

FIG. 14 is a diagram illustrating a syntax example of Branch_Configuration(n).

FIG. 15 is a diagram illustrating a syntax example of PreDelay_Configuration( ).

FIG. 16 is a diagram illustrating a syntax example of MultiTapDelay_Configuration( ).

FIG. 17 is a diagram illustrating a syntax example of AllPassFilter_Configuration( ).

FIG. 18 is a diagram illustrating a syntax example of CombFilter_Configuration( ).

FIG. 19 is a diagram illustrating a syntax example of HighCut_Configuration( ).

FIG. 20 is a diagram illustrating a syntax example of Reverb_Parameter( ).

FIG. 21 is a diagram illustrating a syntax example of Branch_Parameters(n).

FIG. 22 is a diagram illustrating a syntax example of PreDelay_Parameters( ).

FIG. 23 is a diagram illustrating a syntax example of MultiTapDelay_Parameters( ).

FIG. 24 is a diagram illustrating a syntax example of HighCut_Parameters( ).

FIG. 25 is a diagram illustrating a syntax example of AllPassFilter_Parameters( ).

FIG. 26 is a diagram illustrating a syntax example of CombFilter_Parameters( ).

FIG. 27 is a diagram illustrating a syntax example of meta information.

FIG. 30 is a diagram illustrating a syntax example of meta information.

MODE FOR CARRYING OUT THE INVENTION

Hereinafter, embodiments to which the present technology is applied will be described with reference to the drawings.

First Embodiment

<About Present Technology>

The present technology is intended to more effectively implement distance feeling control by adding a reflection component or reverberation component of sound on the basis of a parameter.

That is, the present technology has the following features particularly.

Feature (1)

Distance feeling control is implemented by adding a reflection/reverberation component on the basis of a reverb setting parameter with respect to an object.

Feature (2)

The reflection/reverberation component is localized to a different position from a position of a sound image of the object.

Feature (3)

Position information of the reflection/reverberation component is specified by a relative position with respect to a localization position of a sound image of a target object.

Feature (4)

The position information of the reflection/reverberation component is fixedly specified regardless of the localization position of the sound image of the target object.

Feature (5)

An impulse response of reverb processing added to the object is used as meta information, and at a time of rendering, distance feeling control is implemented by adding the reflection/reverberation component by using filtering processing based on the meta information.

Feature (6)

Configuration information and a coefficient of a reverb processing algorithm to be applied are extracted.

Feature (7)

The configuration information and coefficient of the reverb processing algorithm are parameterized and used as meta information.

Feature (8)

Distance feeling control is implemented by, on the basis of the meta information, reconfiguring the reverb processing algorithm on a reproduction side and adding a reverberation component in rendering of object-based audio.

For example, when a human perceives sound, the human hears not only direct sound from a sound source but also reflection sound or reverberation sound from a wall, or the like, and feels distance from the sound source by volume difference or time difference between the direct sound and the reflection sound or reverberation sound. Therefore, in rendering of an audio object, a distance feeling can be created to sound of the audio object by adding the reflection sound or reverberation sound with the reverb processing or by controlling the time difference or gain difference between the direct sound and the reflected sound or reverberant sound.

Note that, hereinafter, the audio object will also be simply referred to as an object.

<Configuration Example of Signal Processing Device>

Figure 1:
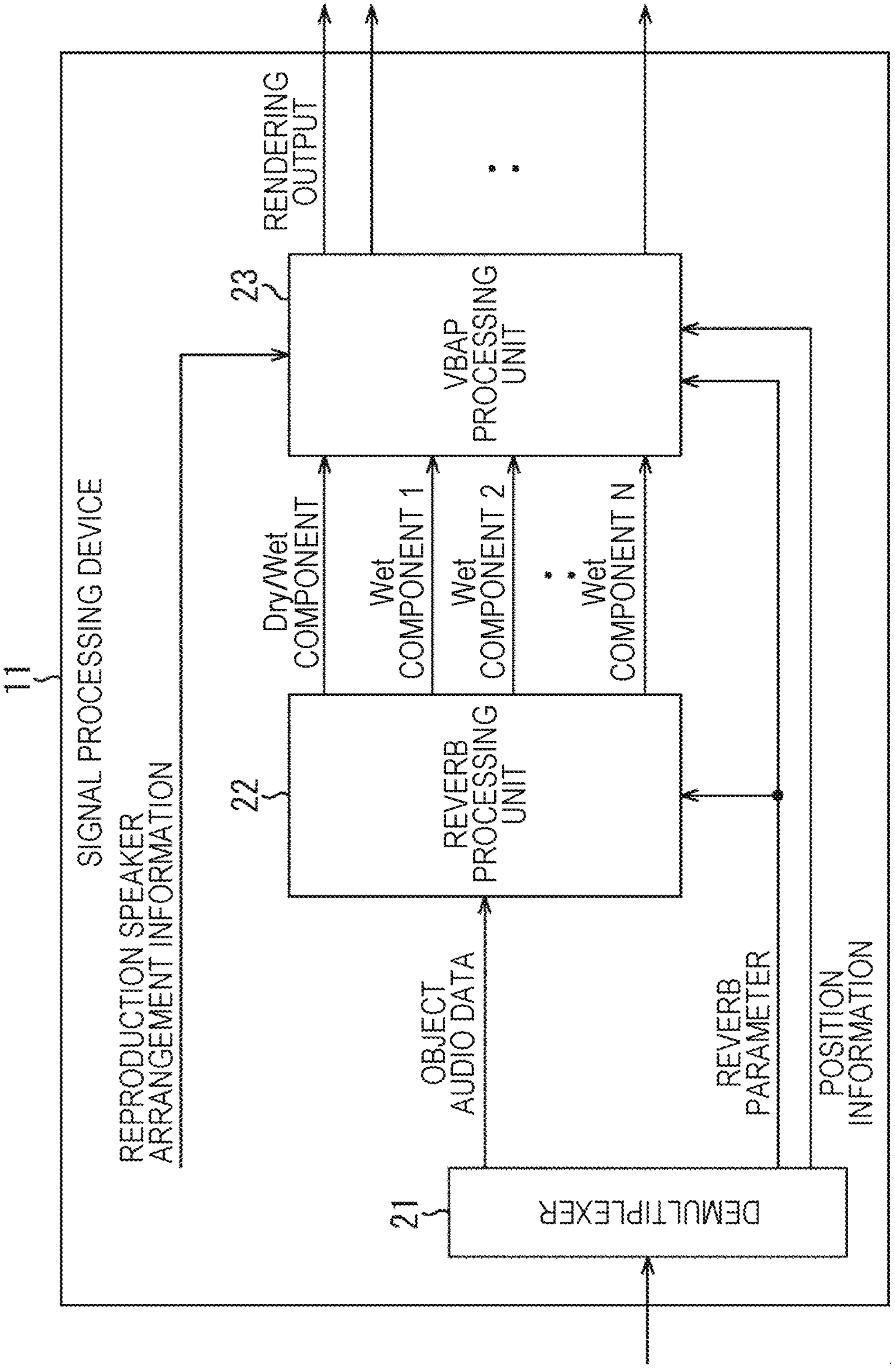
FIG. 1 is a diagram illustrating a configuration example of a signal processing device.

FIG. 1 is a diagram illustrating a configuration example of an embodiment of a signal processing device to which the present technology is applied.

A signal processing device 11 illustrated in FIG. 1 includes a demultiplexer 21, a reverb processing unit 22, and a VBAP processing unit 23.

The demultiplexer 21 separates object audio data, a reverb parameter, and position information from a bitstream in which various kinds of data are multiplexed.

The demultiplexer 21 supplies the separated object audio data to the reverb processing unit 22, supplies the reverb parameter to the reverb processing unit 22 and the VBAP processing unit 23, and supplies the position information to the VBAP processing unit 23.

Here, the object audio data is audio data for reproducing sound of the object. Furthermore, the reverb parameter is information for reverb processing for adding a reflection sound component or a reverberation sound component to the object audio data.

Although, here, the reverb parameter is included in the bitstream as meta information (metadata) of the object, the reverb parameter may not be included in the bitstream and may be provided as an external parameter.

The position information is information indicating a position of the object in three-dimensional space, and the position information includes, for example, a horizontal angle that indicates a position in a horizontal direction of the object viewed from a predetermined reference position, or a perpendicular angle that indicates a position in a perpendicular direction of the object viewed from the predetermined reference position.

The reverb processing unit 22 performs reverb processing on the basis of the object audio data and reverb parameter supplied from the demultiplexer 21 and supplies the signal obtained as a result to the VBAP processing unit 23. That is, the reverb processing unit 22 adds, to the object audio data, a component of reflection sound or reverberation sound, that is, a Wet component (Wet component). Furthermore, the reverb processing unit 22 performs gain control of a Dry component (Dry component), which is direct sound, that is, the object audio data, and the Wet component.

In this example, as a result of the reverb processing, one Dry/Wet component signal indicated by the letters "Dry/Wet component" and N number of Wet component signals indicated by the letters "Wet component 1" to "Wet component N" are obtained.

Here, the Dry/Wet component signal is mixed sound of the direct sound and the reflection sound or reverberation sound, that is, a signal including a Dry component and a Wet component. Note that a Dry/Wet component signal may include only a Dry component or may include only a Wet component.

Furthermore, a Wet component signal generated by reverb processing is a signal including only a component of reflection sound or reverberation sound. In other words, a Wet component signal is a signal of a reverb component such as a reflection sound component or reverberation sound component generated by reverb processing on object audio data. Hereinafter, a Wet component signal indicated by the letters "Wet component 1" to "Wet component N" is also referred to as a Wet component 1 to Wet component N.

Note that, although details will be described later, the Dry/Wet component signal is obtained by adding a component of reflection sound or reverberation sound to original object audio data, and is reproduced on the basis of position information indicating an original position of the object. That is, a sound image of a Dry/Wet component is rendered to be localized to a position of the object indicated by the position information.

Meanwhile, on signals of the Wet component 1 to Wet component N, rendering processing may be performed on the basis of Wet component position information that is position information different from position information indicating the original position of the object. Such Wet component position information is included in, for example, a reverb parameter.

Moreover, although an example in which a Dry/Wet component and a Wet component are generated by reverb processing will be described here, only a Dry/Wet component or only a Dry component and a Wet component 1 to Wet component N may be generated by the reverb processing.

The VBAP processing unit 23 is externally supplied with arrangement of each reproduction speaker constituting a reproduction speaker system that reproduces sound of the object, that is, reproduction speaker arrangement information indicating a speaker configuration.

On the basis of the supplied reproduction speaker arrangement information and the reverb parameter and position information supplied from the demultiplexer 21, the VBAP processing unit 23 functions as a rendering processing unit that performs VBAP processing, or the like, as rendering processing, on the Dry/Wet component and the Wet component 1 to Wet component N that are supplied from the reverb processing unit 22. To a playback speaker, or the like, in a subsequent stage, the VBAP processing unit 23 outputs, as an output signal, the audio signal of each channel corresponding to each reproduction speaker, each the channel being obtained by the rendering processing.

<About Reverb Parameter>

By the way, the reverb parameter supplied to the reverb processing unit 22 or the VBAP processing unit 23 includes information (parameter) necessary for performing reverb processing.

Specifically, for example, the information illustrated in FIG. 2 is included in the reverb parameter.

In the example illustrated in FIG. 2, the reverb parameter includes Dry gain, Wet gain, a reverberation time, a pre-delay delay time, pre-delay gain, an early reflection delay time, early reflection gain, and Wet component position information.

For example, the Dry gain is gain information used for gain control, that is, gain adjustment, of a Dry component, and the Wet gain is gain information used for gain control of the Wet component or Wet component 1 to Wet component N included in the Dry/Wet component.

The reverberation time is time information indicating a reverberation length of reverberation sound included in the sound of the object. The pre-delay delay time is time information indicating a delay time to when reflection sound or reverberation sound other than early reflection sound is first heard, with reference to a time when direct sound is heard. The pre-delay gain is gain information indicating a gain difference from direct sound of a component of sound at a time determined by the pre-delay delay time.

The early reflection delay time is time information indicating a delay time to when early reflection sound is heard, with reference to the time when direct sound is heard, and the early reflection gain is gain information indicating a gain difference from direct sound of the early reflection sound.

For example, if the pre-delay delay time and the early reflection delay time are shortened, and the pre-delay gain and the early reflection gain are reduced, a distance feeling between the object and a viewer/listener (user) becomes closer.

Meanwhile, if the pre-delay delay time and the early reflection delay time are lengthened, and the pre-delay gain and the early reflection gain are increased, the distance feeling between the object and the viewer/listener becomes farther.

The Wet component position information is information indicating the localization position of each sound image of the Wet component 1 to Wet component N in three-dimensional space.

In a case where Wet component position information is included in the reverb parameter, VBAP processing in the VBAP processing unit 23 can localize a sound image of the Wet component to a position different from a position of direct sound of the object, that is, the sound image of the Dry/Wet component, by appropriately determining the Wet component position information.

For example, it is assumed that the Wet component position information includes a horizontal angle and a perpendicular angle indicating a relative position of the Wet component with respect to a position indicated by the position information of the object.

In such a case, as illustrated in FIG. 3 for example, the sound image of each Wet component can be localized to a periphery of a sound image of the Dry/Wet component of the object.

In the example illustrated in FIG. 3, there are a Wet component 1 to Wet component 4 as Wet components, and in the upper side of the figure, Wet component position information of those Wet components is illustrated. Here, the Wet component position information is information indicating the position (direction) of each Wet component viewed from a predetermined origin O.

For example, a position in the horizontal direction of the Wet component 1 is a position determined by an angle obtained by adding 30 degrees to a horizontal angle indicating the position of the object, and a position in the perpendicular direction of the Wet component 1 is a position determined by an angle obtained by adding 30 degrees to a perpendicular angle indicating the position of the object.

Furthermore, in the lower part of the figure, the position of the object and the positions of the Wet component 1 to Wet component 4 are indicated. That is, a position OB11 indicates the position of the object indicated by the position information, and each of a position W11 to a position W14 indicates each position of the Wet component 1 to Wet component 4, which are indicated by the Wet component position information.

In this example, it is understood that the Wet component 1 to Wet component 4 are arranged so as to surround a periphery of the object. In the VBAP processing unit 23, on the basis of the position information of the object, the Wet component position information, and the reproduction speaker arrangement information, an output signal is generated by the VBAP processing so that sound images of the Wet component 1 to Wet component 4 are localized to the position W11 to the position W14.

Thus, by appropriately localizing the Wet components to positions different from the position of the object, distance feeling control of the object can be effectively performed.

Furthermore, although in FIG. 3, the position of each Wet component, that is, the localization position of the sound image of the Wet component is a relative position with respect to the position of the object, the position, not limited to this, may be a specific position (fixed position), or the like, that is determined previously.

In such a case, the position of the Wet component indicated by the Wet component position information is any absolute position in three-dimensional space that is not related to the position of the object indicated by the position information. Then, as illustrated in FIG. 4 for example, the sound image of each Wet component can be localized to any position in the three-dimensional space.

Figure 4:
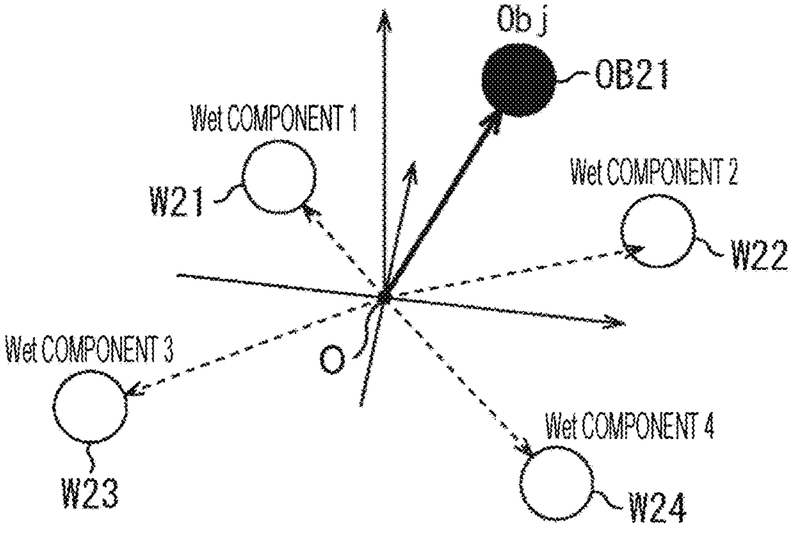
FIG. 4 is a diagram describing Wet component position information and sound image localization of Wet components.

In the example illustrated in FIG. 4, there are the Wet component 1 to Wet component 4 as Wet components, and in the upper side of the figure, the Wet component position information of those Wet components is indicated. Here, the Wet component position information is information indicating an absolute position of each Wet component viewed from the predetermined origin O.

For example, a horizontal angle indicating the position in the horizontal direction of the Wet component 1 is 45 degrees, and a perpendicular angle indicating the position in the perpendicular direction of the Wet component 1 is 0 degrees.

Furthermore, in the lower part of the figure, the position of the object and the positions of the Wet component 1 to Wet component 4 are indicated. That is, a position OB21 indicates the position of the object indicated by the position information, and each of a position W21 to a position W24 indicates each position of the Wet component 1 to Wet component 4, which are indicated by the Wet component position information.

In this example, it is understood that the Wet component 1 to Wet component 4 are arranged so as to surround a periphery of the origin O.

<Description of Audio Signal Output Processing>

Next, operation of the signal processing device 11 will be described. That is, audio signal output processing by the signal processing device 11 will be described below with reference to the flowchart in FIG. 5.

In step S11, the demultiplexer 21 receives the bitstream transmitted from an encoding device, or the like, and separates the object audio data, the reverb parameter, and position information from the received bitstream.

The demultiplexer 21 supplies the object audio data and reverb parameter obtained in this manner to the reverb processing unit 22 and supplies the reverb parameter and the position information to the VBAP processing unit 23.

In step S12, the reverb processing unit 22 performs reverb processing on the object audio data supplied from the demultiplexer 21, on the basis of the reverb parameter supplied from the demultiplexer 21.

That is, in reverb processing, a Dry/Wet component signal and signals of the Wet component 1 to Wet component N are generated by a component of reflection sound or reverberation sound being added to the object audio data, or gain adjustment of direct sound, reflection sound, or reverberation sound, that is, gain adjustment of the Dry component or the Wet component, being implemented. The reverb processing unit 22 supplies the VBAP processing unit 23 with the Dry/Wet component signal and the Wet component 1 to Wet component N signal, which are generated in this manner.

In step S13, the VBAP processing unit 23 performs VBAP processing, or the like, as rendering processing, on the Dry/Wet component and the Wet component 1 to Wet component N, which are from the reverb processing unit 22, on the basis of the supplied reproduction speaker arrangement information and the Wet component position information included in the position information and reverb parameter from the demultiplexer 21, and generates an output signal.

The VBAP processing unit 23 outputs the output signal obtained by the rendering processing to the subsequent stage, and the audio signal output processing ends. For example, the output signal output from the VBAP processing unit 23 is supplied to a reproduction speaker in the subsequent stage, and the reproduction speaker reproduces (outputs) sound of the Dry/Wet component or Wet component 1 to Wet component N on the basis of the supplied output signal.

As described above, the signal processing device 11 performs reverb processing on the object audio data on the basis of the reverb parameter and generates a Dry/Wet component and a Wet component.

With this arrangement, it is possible to implement distance feeling control more effectively on a reproduction side of the object audio data.

That is, by using a reverb parameter as meta information of the object, it is possible to control the distance feeling in rendering of object-based audio.

For example, in a case where a content creator wishes to create a distance feeling for an object, an appropriate reverb parameter is only required to be added as meta information, instead of previously processing the object audio data for a sound quality that creates a distance feeling. By doing so, in rendering on the reproduction side, reverb processing according to meta information (reverb parameter) can be performed on the audio object, and a distance feeling of the object can be reproduced.

Generating a Wet component separately from the Dry/Wet component and localizing the sound image of the Wet component to a predetermined position to implement distance feeling of an object is particularly effective in such a case where a channel configuration of a reproduction speaker is unknown on a content production side, such as a case where VBAP processing is performed as rendering processing.

Second Embodiment

<Configuration Example of Signal Processing Device>

By the way, in the method indicated in the first embodiment, it is assumed that a reverb processing algorithm used by a content creator and a reverb processing algorithm used on a reproduction side, that is, the signal processing device 11 side are the same.

Therefore, in a case where the algorithm on the content creator side and the algorithm on the signal processing device 11 are different from each other, a distance feeling intended by the content creator cannot be reproduced.

Furthermore, because a content creator generally wishes to select and apply optimal reverb processing from among various reverb processing algorithms, it is not practical to limit to one reverb processing algorithm or to a limited type.

Therefore, by using an impulse response as a reverb parameter, a distance feeling may be reproduced as the content creator intends by reverb processing according to meta information, that is, the impulse response as the reverb parameter.

Figure 6:
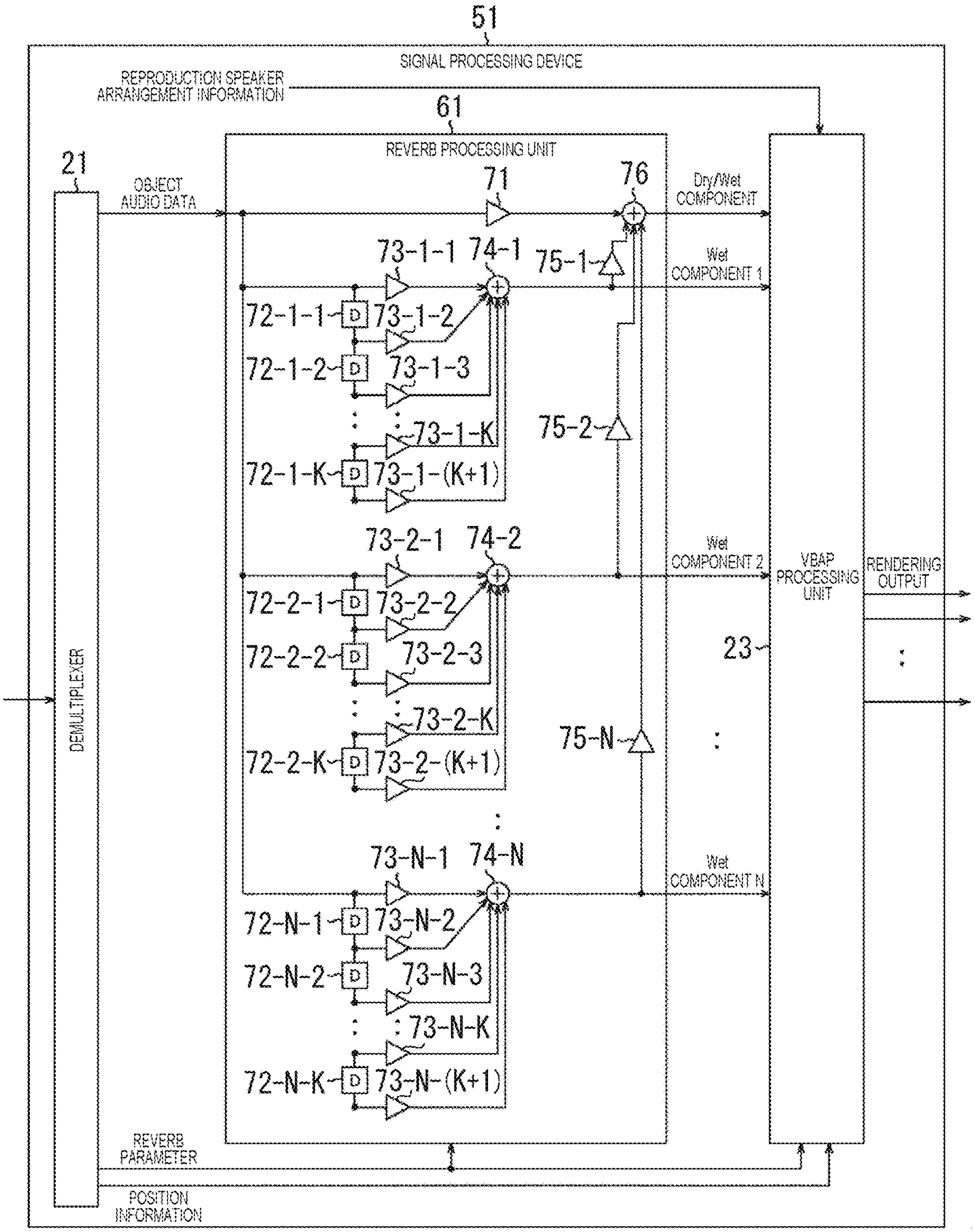
FIG. 6 is a diagram illustrating a configuration example of a signal processing device.

In such a case, a signal processing device is configured as illustrated in FIG. 6, for example. Note that, in FIG. 6, the parts corresponding to the parts in FIG. 1 are provided with the same reference signs, and description of the corresponding parts will be omitted as appropriate.

A signal processing device 51 illustrated in FIG. 6 includes the demultiplexer 21, a reverb processing unit 61, and a VBAP processing unit 23.

The configuration of the signal processing device 51 is different from the configuration of the signal processing device 11 in that the reverb processing unit 61 is provided instead of the reverb processing unit 22 of the signal processing device 11 in FIG. 1, and otherwise, the configuration of the signal processing device 51 is similar to the configuration of the signal processing device 11.

The reverb processing unit 61 performs reverb processing on the object audio data supplied from the demultiplexer 21, on the basis of a coefficient of the impulse response included in the reverb parameter supplied from the demultiplexer 21, and generates each signal of a Dry/Wet component and the Wet component 1 to Wet component N.

In this example, the reverb processing unit 61 is configured by a finite impulse response (FIR) filter. That is, the reverb processing unit 61 includes an amplification unit 71, a delay unit 72-1-1 to a delay unit 72-N–K, an amplification unit 73-1-1 to an amplification unit 73-N–(K+1), an addition unit 74-1 to an addition unit 74-N, amplification unit 75-1 to an amplification unit 75-N, and an addition unit 76.

The amplification unit 71 performs gain adjustment on the object audio data supplied from the demultiplexer 21 by multiplying the object audio data by a gain value included in the reverb parameter, and supplies the object audio data obtained as a result to the addition unit 76. The object audio data obtained by the amplification unit 71 is a Dry component signal, and processing of the gain adjustment in the amplification unit 71 is processing of gain control of direct sound (Dry component).

A delay unit 72-L–1 (where 1≤L≤N) delays the object audio data supplied from the demultiplexer 21 by a predetermined time, and then supplies the object audio data to an amplification unit 73-L–2 and a delay unit 72-L–2.

A delay unit 72-L–M (where 1≤L≤N, 2≤M≤K–1) delays the object audio data supplied from a delay unit 72-L–(M–1) by a predetermined time, and then supplies the object audio data to an amplification unit 73-L–(M+1) and a delay unit 72-L–(M+1).

A delay unit 72-L–K (where 1≤L≤N) delays the object audio data supplied from a delay unit 72-L–(K–1) by a predetermined time, and then supplies the object audio data to an amplification unit 73-L–(K+1).

Note that, here, illustration of a delay unit 72-≤M–1 to a delay unit 72-M–K (where 3≤M≤N–1) is omitted.

Hereinafter, the delay unit 72-M–1 to the delay unit 72-M–K (where 1≤M≤N) will also be simply referred to as a delay unit 72-M in a case where the delay units are not particularly necessary to be distinguished from one another. Furthermore, hereinafter, the delay unit 72-1 to the delay unit 72-N will also be simply referred to as a delay unit 72 in a case where the delay units are not particularly necessary to be distinguished from one another.

An amplification unit 73-M–1 (where 1≤M≤N) performs gain adjustment on the object audio data supplied from the demultiplexer 21 by multiplying the object audio data by a coefficient of the impulse response included in the reverb parameter, and supplies the object audio data obtained as a result to an addition unit 74-M.

An amplification unit 73-L–M (where 1≤L≤N, 2≤M≤K+1) performs gain adjustment on the object audio data supplied from the delay unit 72-L–(M–1) by multiplying the object audio data by a coefficient of the impulse response included in the reverb parameter, and supplies the object audio data obtained as a result to an addition unit 74-L.

Note that, in FIG. 6, illustration of an amplification unit 73-3-1 to an amplification unit 73-(N–1)-(K+1) is omitted.

Furthermore, hereinafter, an amplification unit 73-L–1 to the amplification unit 73-L–(K+1) (where 1≤L≤N) will also be simply referred to as an amplification unit 73-L in a case where the amplification units are not particularly necessary to be distinguished from one another. Moreover, hereinafter, an amplification unit 73-1 to an amplification unit 73-N will also be simply referred to as an amplification unit 73 in a case where the amplification units are not particularly necessary to be distinguished from one another.

The addition unit 74-M (where 1≤M≤N) adds the object audio data supplied from the amplification unit 73-M–1 to an amplification unit 73-M–(K+1), and supplies the Wet component M (where 1≤M≤N) obtained as a result to an amplification unit 75-M and the VBAP processing unit 23.

Note that, here, illustration of an addition unit 74-3 to an addition unit 74-(N–1) is omitted. Hereinafter, the addition unit 74-1 to the addition unit 74-N will also be simply referred to as an addition unit 74 in a case where the addition units are not particularly necessary to be distinguished from one another.

The amplification unit 75-M (where 1≤M≤N) performs gain adjustment on the signal of the Wet component M (where 1≤M≤N) supplied from the addition unit 74-M by multiplying the signal by the gain value included in the reverb parameter, and supplies the Wet component signal obtained as a result to the addition unit 76.

Note that, here, illustration of an amplification unit 75-3 to an amplification unit 75-(N–1) is omitted. Hereinafter, the amplification unit 75-1 to the amplification unit 75-N will also be simply referred to as an amplification unit 75 in a case where the amplification units are not particularly necessary to be distinguished from one another.

The addition unit 76 adds object audio data supplied from the amplification unit 71 and the Wet component signal supplied from each of the amplification unit 75-1 to the amplification unit 75-N, and supplies the signal obtained as a result, as a Dry/Wet component signal, to the VBAP processing unit 23.

In a case where the reverb processing unit 61 has such a configuration, an impulse response of reverb processing applied at a time of content creation is used as meta information included in the bitstream, that is, a reverb parameter. In such a case, syntax for the meta information (reverb parameter) is as illustrated in FIG. 7 for example.

In the example illustrated in FIG. 7, the meta information, that is, the reverb parameter, includes a dry gain, which is a gain value for direct sound (Dry component) indicated by the letters "dry_gain". This dry gain dry_gain is supplied to the amplification unit 71 and used for the gain adjustment in the amplification unit 71.

Furthermore, in this example, following the dry gain, localization mode information of a Wet component (reflection/reverberation sound) indicated by the letters "wet_position_mode" is stored.

For example, "0" as a value for localization mode information wet_position_mode indicates a relative localization mode in which Wet component position information indicating a position of a Wet component is information indicating a relative position with respect to a position indicated by position information of an object. For example, the example described with reference to FIG. 3 is in the relative localization mode.

Meanwhile, "1" as a value for the localization mode information wet_position_mode indicates an absolute localization mode in which Wet component position information indicating a position of a Wet component is information indicating an absolute position in three-dimensional space, regardless of a position of an object. For example, the example described with reference to FIG. 4 is in the absolute localization mode.

Furthermore, following the localization mode information wet_position_mode, the number of Wet component (reflection/reverberation sound) signals to be output, that is, the number of outputs of the Wet components, indicated by the letters "number_of_wet_outputs" is stored. In the example illustrated in FIG. 6, because N number of Wet component signals of the Wet component 1 to the Wet component N are output to the VBAP processing unit 23, the value for the number of outputs number_of_wet_outputs is "N".

Moreover, following the number of outputs number_of_wet_outputs, a gain value for the Wet component is stored by the number indicated by the number of outputs number_of_wet_outputs. That is, here, a gain value for the i-th Wet component i indicated by the letters "wet_gain[i]" is stored. This gain value wet_gain[i] is supplied to the amplification unit 75 and used for the gain adjustment in the amplification unit 75.

Furthermore, in a case where the value for the localization mode information wet_position_mode is "0", a horizontal angle indicated by the letters "wet_position_azimuth_offset [i]" and a perpendicular angle indicated by the letters "wet_position_elevation_offset[i]" are stored, following the gain value wet_gain[i].

The horizontal angle wet_position_azimuth_offset[i] indicates a relative horizontal angle with respect to the position of the object, which indicates the position in the horizontal direction of the i-th Wet component i in three-dimensional space. Similarly, the perpendicular angle wet_position_elevation_offset[i] indicates a relative perpendicular angle with respect to the position of the object, which indicates a position in the perpendicular direction of the i-th Wet component i in the three-dimensional space.

Therefore, in this case, the position of the i-th Wet component i in the three-dimensional space is obtained from the horizontal angle wet_position_azimuth_offset[i] and the perpendicular angle wet_position_elevation_offset[i], and the position information of the object.

Meanwhile, in a case where the value for the localization mode information wet_position_mode is "1", a horizontal angle indicated by the letters "wet_position_azimuth[i]" and a perpendicular angle indicated by the letters "wet_position_elevation[i]" are stored, following the gain value wet_gain[i].

The horizontal angle wet_position_azimuth[i] indicates a horizontal angle indicating an absolute position in the horizontal direction of the i-th Wet component i in the three-dimensional space. Similarly, the perpendicular angle wet_position_elevation[i] indicates a perpendicular angle indicating an absolute position in the perpendicular direction of the i-th Wet component i in the three-dimensional space.

Furthermore, the reverb parameter stores tap length of the impulse response for the i-th Wet component i, that is, tap length information indicating the number of coefficients of the impulse response, indicated by the letters "number_of_taps[i]".

Then, following the tap length information number_of_taps[i], the coefficient of the impulse response for the i-th Wet component i indicated by the letters "coef[i][j]" is stored by the number indicated by the tap length information number_of_taps[i].

This coefficient coef[i][j] is supplied to the amplification unit 73 and used for the gain adjustment in the amplification unit 73. For example, in the example illustrated in FIG. 6, the coefficient coef[0][0] is supplied to the amplification unit 73-1-1, and the coefficient coef[0][1] is supplied to an amplification unit 73-1-2.

In this way, a distance feeling can be reproduced as a content creator intends by adding the impulse response as the meta information (reverb parameter) and performing reverb processing on the audio object in rendering on the reproduction side, according to the meta information.

<Description of Audio Signal Output Processing>

Figure 8:
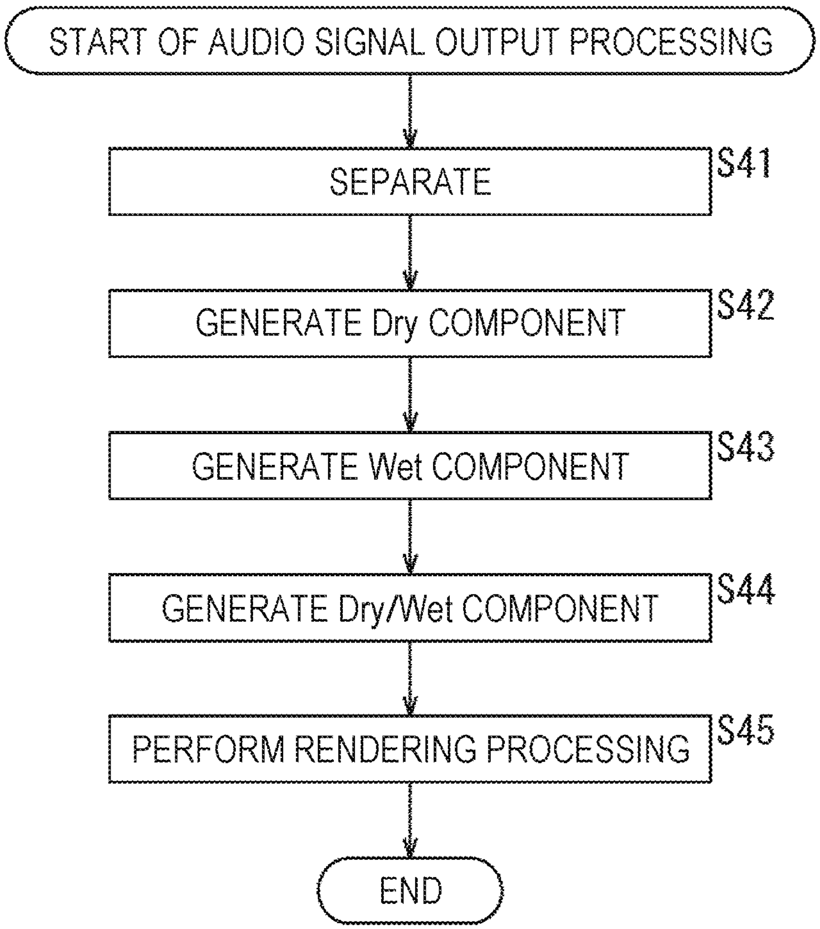
FIG. 8 is a flowchart describing audio signal output processing.

Next, operation of the signal processing device 51 illustrated in FIG. 6 will be described. That is, audio signal output processing by the signal processing device 51 will be described below with reference to the flowchart in FIG. 8.

Figure 5:
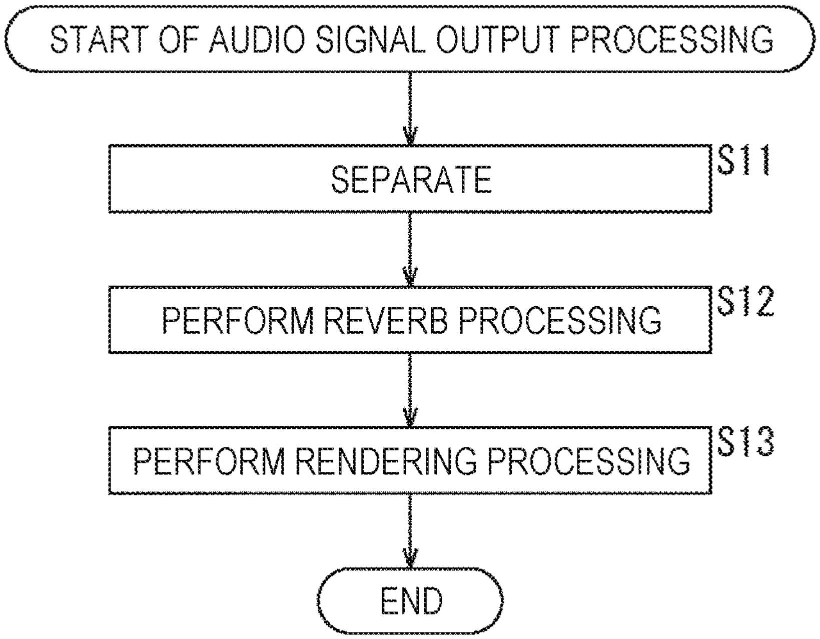
FIG. 5 is a flowchart describing audio signal output processing.

Note that, because the processing in step S41 is similar to the processing in step S11 in FIG. 5, description of the processing in step S41 will be omitted. However, in step S41, the reverb parameter illustrated in FIG. 7 is read from the bitstream by the demultiplexer 21 and supplied to the reverb processing unit 61 and the VBAP processing unit 23.

In step S42, the amplification unit 71 of the reverb processing unit 61 generates a Dry component signal, and supplies the Dry component signal to the addition unit 76.

That is, the reverb processing unit 61 supplies the amplification unit 71 with the dry gain dry_gain included in the reverb parameter supplied from the demultiplexer 21. Furthermore, the amplification unit 71 generates a Dry component signal by performing gain adjustment on the object audio data supplied from the demultiplexer 21 by multiplying the object audio data by a dry gain dry_gain.

In step S43, the reverb processing unit 61 generates the Wet component 1 to Wet component N.

That is, the reverb processing unit 61 reads a coefficient of the impulse response coef[i][j] included in the reverb parameter supplied from the demultiplexer 21, supplies the coefficient coef[i][j] to the amplification unit 73, and supplies the gain value wet_gain included in the reverb parameter to the amplification unit 75.

Furthermore, each delay unit 72 delays the object audio data supplied from the demultiplexer 21, another delay unit 72, or the like, which is in a preceding stage of own, by a predetermined time, and then supplies the object audio data to the delay unit 72 or the amplification unit 73 in a subsequent stage. The amplification unit 73 multiplies the object audio data supplied from the demultiplexer 21, another delay unit 72, or the like, which is in the preceding stage of own, by the coefficient coef[i][j] supplied from the reverb processing unit 61, and supplies the object audio data to the addition unit 74.

The addition unit 74 generates a Wet component by adding the object audio data supplied from the amplification unit 73, and supplies the obtained Wet component signal to the amplification unit 75 and the VBAP processing unit 23. Moreover, the amplification unit 75 multiplies the Wet component signal supplied from the addition unit 74 by the gain value wet_gain[i] supplied from the reverb processing unit 61, and supplies the Wet component signal to the addition unit 76.

In step S44, the addition unit 76 generates a Dry/Wet component signal by adding the Dry component signal supplied from the amplification unit 71 and the Wet component signal supplied from the amplification unit 75, and supplies the Dry/Wet component signal to the VBAP processing unit 23.

In step S45, the VBAP processing unit 23 performs VBAP processing, or the like, as rendering processing, and generates an output signal.

For example, in step S45, processing similar to the processing in step S13 in FIG. 5 is performed. In step S45, in VBAP processing for example, the horizontal angle wet_position_azimuth_offset[i] and the perpendicular angle wet_position_elevation_offset[i], or the horizontal angle wet_position_azimuth[i] and the perpendicular angle wet_position_elevation[i], which are included in the reverb parameter, are used as Wet component position information.

When an output signal is obtained in this manner, the VBAP processing unit 23 outputs the output signal to the subsequent stage, and the audio signal output processing ends.

As described above, the signal processing device 51 performs reverb processing on the object audio data on the basis of the reverb parameter including the impulse response, and generates a Dry/Wet component and a Wet component. Note that, in an encoding device, the meta information or the position information indicated in FIG. 7 and a bitstream storing encoded object audio data are generated.

With this arrangement, it is possible to implement distance feeling control more effectively on a reproduction side of the object audio data. A distance feeling can be reproduced as a content creator intends by, in particular, performing reverb processing using an impulse response, even in a case where a reverb processing algorithm on the signal processing device 51 side and a reverb processing algorithm on the content production side are different from each other.

Third Embodiment

<Configuration Example of Signal Processing Device>

Note that, in the second embodiment, an impulse response of reverb processing that a content creator wishes to add is used as a reverb parameter. However, the impulse response of the reverb processing that the content creator wishes to add usually has very long tap length.

Therefore, in a case where such an impulse response is transmitted as meta information (reverb parameter), the reverb parameter becomes a very large amount of data. Furthermore, because an entire impulse response changes even in a case where a parameter of reverb is slightly changed, it is necessary to retransmit a reverb parameter having a large data amount each time.

Therefore, a Dry/Wet component or a Wet component may be generated by parametric reverb. In such a case, a reverb processing unit is configured by parametric reverb obtained by a combination of multi-tap delay, a comb filter, an all-pass filter, and the like.

Then, with such a reverb processing unit, a Dry/Wet component signal or a Wet component is generated by, on the basis of the reverb parameter, reflection sound or reverberation sound being added to object audio data, or gain control of direct sound, reflection sound, or reverberation sound being implemented.

Figure 9:
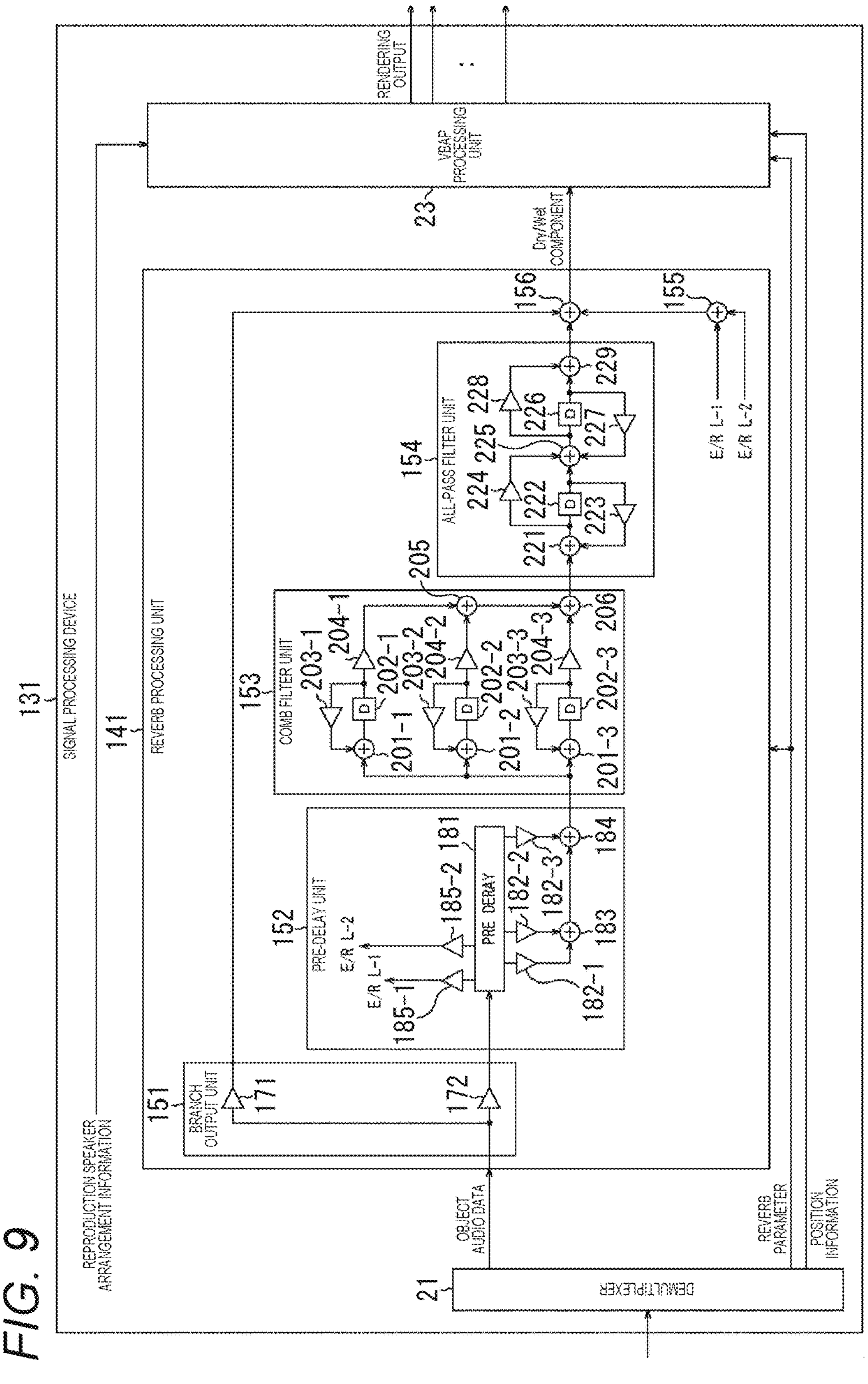
FIG. 9 is a diagram illustrating a configuration example of a signal processing device.

In a case where the reverb processing unit is configured by parametric reverb, for example, a signal processing device is configured as illustrated in FIG. 9. Note that, in FIG. 9, the parts corresponding to the parts in FIG. 1 are provided with the same reference signs, and description of the corresponding parts will be omitted as appropriate.

A signal processing device 131 illustrated in FIG. 9 includes a demultiplexer 21, a reverb processing unit 141, and a VBAP processing unit 23.

Configuration of this signal processing device 131 is different from configuration of the signal processing device 11 in that the reverb processing unit 141 is provided instead of the reverb processing unit 22 of the signal processing device 11 in FIG. 1, and otherwise, the configuration of the signal processing device 131 is similar to the configuration of the signal processing device 11.

The reverb processing unit 141 generates a Dry/Wet component signal by performing reverb processing on the object audio data supplied from the demultiplexer 21 on the basis of the reverb parameter supplied from the demultiplexer 21, and supplies the Dry/Wet component signal to the VBAP processing unit 23.

Note that, although an example in which only a Dry/Wet component signal is generated in the reverb processing unit 141 will be described here for simplicity of description, signals of the Wet component 1 to Wet component N, not only the Dry/Wet component may be generated needless to say, similarly to the cases of the above-described first embodiment and second embodiment.

In this example, the reverb processing unit 141 has a branch output unit 151, a pre-delay unit 152, a comb filter unit 153, an all-pass filter unit 154, an addition unit 155, and an addition unit 156. That is, parametric reverb implemented by the reverb processing unit 141 includes a plurality of configuration elements including a plurality of filters.

In particular, in the reverb processing unit 141, the branch output unit 151, the pre-delay unit 152, the comb filter unit 153, and the all-pass filter unit 154 are configuration elements constituting the parametric reverb. Here, a configuration element of parametric reverb is each processing to implement reverb processing by the parametric reverb, that is, a processing block such as a filter for executing a part of the reverb processing.

Note that the configuration of the parametric reverb of the reverb processing unit 141 illustrated in FIG. 9 is merely an example, and any combination of configuration elements, any parameter, and any reconfiguration method (reconstruction method) of the parametric reverb may be used.

The branch output unit 151 branches the object audio data supplied from the demultiplexer 21 into the number of components of generated signals of a Dry component, Wet component, or the like, or into the number of branches determined by the number of processing performed in parallel, or the like, and performs gain adjustment of the branched signals.

In this example, the branch output unit 151 includes an amplification unit 171 and an amplification unit 172, and the object audio data supplied to the branch output unit 151 is branched into two and supplied to the amplification unit 171 and the amplification unit 172.

The amplification unit 171 performs gain adjustment on the object audio data supplied from the demultiplexer 21 by multiplying the object audio data by the gain value included in the reverb parameter, and supplies the object audio data obtained as a result to the addition unit 156. A signal (object audio data) output from the amplification unit 171 is a Dry component signal included in the Dry/Wet component signal.

The amplification unit 172 performs gain adjustment on the object audio data supplied from the demultiplexer 21 by multiplying the object audio data by the gain value included in the reverb parameter, and supplies the object audio data obtained as a result to the pre-delay unit 152. A signal (object audio data) output from the amplification unit 172 is a signal that is a source of a Wet component included in the Dry/Wet component signal.

The pre-delay unit 152 generates a pseudo signal of a component of reflection sound or reverberation sound to be a base by performing filter processing on the object audio data supplied from the amplification unit 172 and supplies the pseudo signal to the comb filter unit 153 and the addition unit 155.

The pre-delay unit 152 includes a pre-delay processing unit 181, an amplification unit 182-1 to an amplification unit 182-3, an addition unit 183, an addition unit 184, an amplification unit 185-1, and an amplification unit 185-2. Note that, hereinafter, the amplification unit 182-1 to the amplification unit 182-3 will also be simply referred to as an amplification unit 182 in a case where the amplification units are not particularly necessary to be distinguished from one another. Furthermore, hereinafter, the amplification unit 185-1 and the amplification unit 185-2 will also be simply referred to as an amplification unit 185 in a case where the amplification units are not particularly necessary to be distinguished from each other.

The pre-delay processing unit 181 delays the object audio data supplied from the amplification unit 172 by the number of delay samples (delay time) included in the reverb parameter for each output destination, and supplies the object audio data to an amplification unit 182 and an amplification unit 185.

The amplification unit 182-1 and the amplification unit 182-2 perform gain adjustment on the object audio data supplied from the pre-delay processing unit 181 by multiplying the object audio data by the gain value included in the reverb parameter, and supplies the object audio data to the addition unit 183. The amplification unit 182-3 performs gain adjustment on the object audio data supplied from the pre-delay processing unit 181 by multiplying the object audio data by the gain value included in the reverb parameter, and supplies the object audio data to the addition unit 184.

The addition unit 183 adds the object audio data supplied from the amplification unit 182-1 and the object audio data supplied from the amplification unit 182-2, and supplies the obtained result to the addition unit 184. The addition unit 184 adds the object audio data supplied from the addition unit 183 and the object audio data supplied from the amplification unit 182-3, and supplies the Wet component signal obtained as a result to the comb filter unit 153.

Processing performed by the amplification unit 182, the addition unit 183, and the addition unit 184 in this manner is filter processing of pre-delay, and the Wet component signal generated by this filter processing is, for example, a signal of reflection sound or reverberation sound other than early reflection sound.

The amplification unit 185-1 performs gain adjustment on the object audio data supplied from the pre-delay processing unit 181 by multiplying the object audio data by the gain value included in the reverb parameter, and supplies the Wet component signal obtained as a result to the addition unit 155.

Similarly, the amplification unit 185-2 performs gain adjustment on the object audio data supplied from the pre-delay processing unit 181 by multiplying the object audio data by the gain value included in the reverb parameter, and supplies the Wet component signal obtained as a result to the addition unit 155.

Processing performed by these amplification units 185 is filter processing of early reflection, and a Wet component signal generated by this filter processing is, for example, a signal of early reflection sound.

The comb filter unit 153 includes a comb filter and increases density of a component of reflection sound or reverberation sound by performing filter processing on the Wet component signal supplied from the addition unit 184.

In this example, the comb filter unit 153 is a three-line, one-section comb filter. That is, the comb filter unit 153 includes an addition unit 201-1 to an addition unit 201-3, a delay unit 202-1 to a delay unit 202-3, an amplification unit 203-1 to an amplification unit 203-3, an amplification unit 204-1 to an amplification unit 204-3, an addition unit 205, and an addition unit 206.

The Wet component signal is supplied from the addition unit 184 of the pre-delay unit 152 to the addition unit 201-1 to the addition unit 201-3 of each line.

The addition unit 201-M (where 1≤M≤3) adds the Wet component signal supplied from the addition unit 184 and the Wet component signal supplied from the amplification unit 203-M, and supplies the obtained result to the delay unit 202-M. Note that, hereinafter, the addition unit 201-1 to the addition unit 201-3 will also be simply referred to as an addition unit 201 in a case where the addition units are not particularly necessary to be distinguished from one another.

A delay unit 202-M (where 1≤M≤3) delays the Wet component signal supplied from the addition unit 201-M by the number of delay samples (delay time) included in the reverb parameter, and supplies the Wet component signal to an amplification unit 203-M and an amplification unit 204-M. Note that, hereinafter, the delay unit 202-1 to the delay unit 202-3 will also be simply referred to as a delay unit 202 in a case where the delay units are not particularly necessary to be distinguished from one another.

The amplification unit 203-M (where 1≤M≤3) performs gain adjustment on the Wet component signal supplied from the delay unit 202-M by multiplying the Wet component signal by the gain value included in the reverb parameter, and supplies the Wet component signal to the addition unit 201-M. Note that, hereinafter, the amplification unit 203-1 to the amplification unit 203-3 will also be simply referred to as an amplification unit 203 in a case where the amplification units are not particularly necessary to be distinguished from one another.

The amplification unit 204-1 and an amplification unit 204-2 perform gain adjustment on the Wet component signal supplied from the delay unit 202-1 and a delay unit 202-2 by multiplying the Wet component signal by the gain value included in the reverb parameter, and supplies the Wet component signal to the addition unit 205.

Furthermore, the amplification unit 204-3 performs gain adjustment on the Wet component signal supplied from the delay unit 202-3 by multiplying the Wet component signal by the gain value included in the reverb parameter, and supplies the Wet component signal to the addition unit 206. Note that, hereinafter, the amplification unit 204-1 to the amplification unit 204-3 will also be simply referred to as an amplification unit 204 in a case where the amplification units are not particularly necessary to be distinguished from one another.

The addition unit 205 adds the Wet component signal supplied from the amplification unit 204-1 and the Wet component signal supplied from an amplification unit 204-2, and supplies the obtained result to the addition unit 206.

The addition unit 206 adds the Wet component signal supplied from the amplification unit 204-3 and the Wet component signal supplied from the addition unit 205, and supplies, as output of the comb filter, the Wet component signal obtained as a result to the all-pass filter unit 154.

In the comb filter unit 153, the addition unit 201-1 to the amplification unit 204-1 are configuration elements of a first line, first section of the comb filter, an addition unit 201-2 to the amplification unit 204-2 are configuration elements of a second line, first section of the comb filter, and the addition unit 201-3 to the amplification unit 204-3 are configuration elements of a third line, first section of the comb filter.

The all-pass filter unit 154 includes an all-pass filter and increases density of a component of reflection sound or reverberation sound by performing filter processing on the Wet component signal supplied from the addition unit 206.

In this example, the all-pass filter unit 154 is a one-line, two-section all-pass filter. That is, the all-pass filter unit 154 includes an addition unit 221, a delay unit 222, an amplification unit 223, an amplification unit 224, an addition unit 225, a delay unit 226, an amplification unit 227, an amplification unit 228, and an addition unit 229.

The addition unit 221 adds the Wet component signal supplied from the addition unit 206 and the Wet component signal supplied from the amplification unit 223, and supplies the obtained result to the delay unit 222 and the amplification unit 224.

The delay unit 222 delays the Wet component signal supplied from the addition unit 221 by the number of delay samples (delay time) included in the reverb parameter, and supplies the Wet component signal to the amplification unit 223 and the addition unit 225.

The amplification unit 223 performs gain adjustment on the Wet component signal supplied from the delay unit 222 by multiplying the Wet component signal by the gain value included in the reverb parameter, and supplies the Wet component signal to the addition unit 221. The amplification unit 224 performs gain adjustment on the Wet component signal supplied from the addition unit 221 by multiplying the Wet component signal by the gain value included in the reverb parameter, and supplies the Wet component signal to the addition unit 225.

The addition unit 225 adds the Wet component signal supplied from the delay unit 222, the Wet component signal supplied from the amplification unit 224, and the Wet component signal supplied from the amplification unit 227, and supplies the obtained result to the delay unit 226 and the amplification unit 228.

In the all-pass filter unit 154, these addition unit 221 to addition unit 225 are configuration elements of a first line, first section of the all-pass filter.

Furthermore, the delay unit 226 delays the Wet component signal supplied from the addition unit 225 by the number of delay samples (delay time) included in the reverb parameter, and supplies the Wet component signal to the amplification unit 227 and the addition unit 229.

The amplification unit 227 performs gain adjustment on the Wet component signal supplied from the delay unit 226 by multiplying the Wet component signal by the gain value included in the reverb parameter, and supplies the Wet component signal to the addition unit 225. The amplification unit 228 performs gain adjustment by multiplying the Wet component signal supplied from the addition unit 225 by the gain value included in the reverb parameter, and supplies the Wet component signal to the addition unit 229.

The addition unit 229 adds the Wet component signal supplied from the delay unit 226 and the Wet component signal supplied from the amplification unit 228, and supplies, as output of the all-pass filter, the Wet component signal obtained as a result to the addition unit 156.

In the all-pass filter unit 154, these addition unit 225 to addition unit 229 are configuration elements of a first line, second section of the all-pass filter.

The addition unit 155 adds the Wet component signal supplied from the amplification unit 185-1 of the pre-delay unit 152 and the Wet component signal supplied from the amplification unit 185-2, and supplies the obtained result to the addition unit 156. The addition unit 156 adds the object audio data supplied from the amplification unit 171 of the branch output unit 151, the Wet component signal supplied from the addition unit 229, and the Wet component signal supplied from the addition unit 155, and supplies the signal obtained as a result, as a Dry/Wet component signal, to the VBAP processing unit 23.

As described above, the configuration of the reverb processing unit 141, that is, the parametric reverb, illustrated in FIG. 9 is merely an example, and any configuration may be used as long as the parametric reverb is configured with a plurality of configuration elements including one or a plurality of filters. For example, parametric reverb can be configured by a combination of each of the configuration elements illustrated in FIG. 10.

In particular, each configuration element can be reconstructed (reproduced) on a reproduction side of the object audio data by providing configuration information indicating configuration of the configuration element and coefficient information (parameter) indicating a gain value, a delay time, and the like, used in processing in a block constituting the configuration element. In other words, parametric reverb can be reconstructed on the reproduction side by providing the reproduction side with information indicating what configuration element the parametric reverb includes, and the configuration information and coefficient information about each configuration element.

In the example illustrated in FIG. 10, the configuration element indicated by the letters "Branch" is a branch configuration element corresponding to the branch output unit 151 in FIG. 9. This configuration element can be reconstructed by the number of branch lines as a signal of configuration information and a gain value in each amplification unit as coefficient information.

For example, in the example illustrated in FIG. 9, the number of branch lines of the branch output unit 151 is 2, and a gain value used in each of the amplification unit 171 and amplification unit 172 is the gain value for the coefficient information.

Furthermore, the configuration element indicated by the letters “PreDelay” is pre-delay corresponding to the pre-delay unit 152 in FIG. 9. This configuration element can be reconstructed by the number of pre-delay taps and the number of early reflection taps as configuration information, and a delay time of each signal and the gain value in each amplification unit as coefficient information.

For example, in the example illustrated in FIG. 9, the number of pre-delay taps “3”, which is the number of the amplification units 182, and the number of early reflection taps is “2”, which is the number of the amplification units 185. Furthermore, the number of delay samples for signals output to each amplification unit 182 or amplification unit 185 in the pre-delay processing unit 181 is a delay time of the coefficient information, and a gain value used in the amplification unit 182 or the amplification unit 185 is the gain value for the coefficient information.

The configuration element indicated by the letters “Multi Tap Delay” is multi-tap delay, that is, a filter, that duplicates a component of reflection sound or reverberation sound to be a base, the component being generated by a pre-delay unit, and generates more components of reflection sound or reverberation sound (Wet component signal). This configuration element can be reconstructed by the number of multi-taps as configuration information, and a delay time of each signal and gain value in each amplification unit as coefficient information. Here, the number of multi-taps indicates the number for when duplicating a Wet component signal, that is, the number of Wet component signals after the duplication.

The configuration element indicated by the letters “All Pass Filters” is an all-pass filter corresponding to the all-pass filter unit 154 in FIG. 9. This configuration element can be reconstructed by the number of all-pass filter lines (number of lines) and number of all-pass filter sections as configuration information, and a delay time of each signal and gain value in each amplification unit as coefficient information.

For example, in the example illustrated in FIG. 9, the number of all-pass filter lines is “1”, and the number of all-pass filter sections is “2”. Furthermore, the number of delay samples for signals in the delay unit 222 or delay unit 226 in the all-pass filter unit 154 is a delay time of the coefficient information, and a gain value used in the amplification unit 223, the amplification unit 224, the amplification unit 227, or the amplification unit 228 is the gain value for the coefficient information.

The configuration element indicated by the letters “Comb Filters” is a comb filter corresponding to the comb filter unit 153 in FIG. 9. This configuration element can be reconstructed by the number of comb filter lines (number of lines) and number of comb filter sections as configuration information, and a delay time of each signal and gain value in each amplification unit as coefficient information.

For example, in the example illustrated in FIG. 9, the number of comb filter lines is “3”, and the number of comb filter sections is “1”. Furthermore, the number of delay samples for signals in the delay unit 202 in the comb filter unit 153 is delay time of the coefficient information, and a gain value used in the amplification unit 203 or the amplification unit 204 is the gain value for the coefficient information.

The configuration element indicated by the letters “High Cut Filter” is a high-range cut filter. This configuration element does not require configuration information and can be reconstructed by a gain value in each amplification unit as coefficient information.

As described above, parametric reverb can be configured by combining configuration elements illustrated in FIG. 10 with any configuration information and coefficient information about those configuration elements. Therefore, configuration of the reverb processing unit 141 can be configuration in which these configuration elements are combined with any configuration information and coefficient information.

<Syntax Example of Meta Information>

Described next is meta information (reverb parameter) that is supplied to the reverb processing unit 141 in a case where the reverb processing unit 141 is configured by parametric reverb. In such a case, syntax for the meta information is as illustrated in FIG. 11 for example.

In the example illustrated in FIG. 11, the meta information includes Reverb_Configuration( ) and Reverb_Parameter( ). Here, Reverb_Configuration( ) includes the above-described Wet component position information or configuration information of a configuration element of the parametric reverb, and Reverb_Parameter( ) includes coefficient information of a configuration element of the parametric reverb.

In other words, Reverb_Configuration( ) includes information indicating a localization position of sound image of each Wet component (reverb component) and configuration information indicating configuration of the parametric reverb. Furthermore, Reverb_Parameter( ) includes, as coefficient information, a parameter used in processing by a configuration element of the parametric reverb.

Hereinafter, Reverb_Configuration( ) and Reverb_Parameter( ) will be further described.

Syntax for Reverb_Configuration( ) is, for example, as illustrated in FIG. 12.

In the example illustrated in FIG. 12, Reverb_Configuration( ) includes localization mode information wet_position_mode and the number of outputs number_of_wet_outputs. Note that, because the localization mode information wet_position_mode and the number of outputs number_of_wet_outputs are the same as the ones in FIG. 7, description of those will be omitted.

Furthermore, in a case where the value for the localization mode information wet_position_mode is “0”, the horizontal angle wet_position_azimuth_offset[i] and the perpendicular angle wet_position_elevation_offset[i] are included, as Wet component position information, in Reverb_Configuration ( ). Meanwhile, in a case where the value for the localization mode information wet_position_mode is “1”, the horizontal angle wet_position_azimuth[i] and a perpendicular angle wet_position_elevation[i] are included as Wet component position information.

Note that, because these horizontal angle wet_position_azimuth_offset[i], perpendicular angle wet_position_elevation_offset[i], horizontal angle wet_position_azimuth[i], and perpendicular angle wet_position_elevation[i] are the same as the ones in FIG. 7, description of those will be omitted.

Moreover, Reverb_Configuration( ) includes Reverb_Structure( ) in which configuration information of each configuration element of the parametric reverb is stored.

Syntax for this Reverb_Structure( ) is, for example, as illustrated in FIG. 13.

In the example illustrated in FIG. 13, Reverb_Structure ( ) stores information of a configuration element, or the like, indicated by the element ID(elem_id[ ]).

For example, the value "0" for elem_id[ ] indicates a branch configuration element (BRANCH), the value "1" for elem_id[ ] indicates pre-delay (PRE_DELAY), the value "2" for elem_id[ ] indicates an all-pass filter (ALL_PASS_FILTER), and the value "3" for elem_id[ ] indicates multi-tap delay (MULTI_TAP_DELAY).

Furthermore, the value "4" for elem_id[ ] indicates the comb filter (COMB_FILTER), the value "5" for elem_id[ ] indicates a high-range cut filter (HIGH_CUT), the value "6" for elem_id[ ] indicates a terminal of a loop (TERM), and the value "7" for elem_id[ ] indicates a terminal of a loop (OUTPUT).

Specifically, for example, in a case where the value for elem_id[ ] is "0", Branch_Configuration(n), which is configuration information of a branch configuration element, is stored, and in a case where the value for elem_id[ ] is "1", PreDelay_Configuration( ), which is a pre-delay configuration information, is stored.

Furthermore, in a case where the value for elem_id[ ] is "2", AllPassFilter_Configuration( ), which is configuration information of the all-pass filter, is stored, and in a case where the value for elem_id[ ] is "3", MultiTapDelay_Configuration( ), which is configuration information of multi-tap delay, is stored.

Moreover, in a case where the value for elem_id[ ] is "4", CombFilter_Configuration( ), which is configuration information of the comb filter, is stored, and in a case where the value for elem_id[ ] is "5", HighCut_Configuration( ), which is configuration information of a high-range cut filter, is stored.

Next, Branch_Configuration(n), PreDelay_Configuration ( ), AllPassFilter_Configuration( ) MultiTapDelay_Configuration( ), CombFilter_Configuration( ) and HighCut_Configuration( ) in which configuration information is stored will be further described.

For example, Syntax for Branch_Configuration(n) is as illustrated in FIG. 14.

In this example, as configuration information of branch configuration elements, Branch_Configuration(n) stores the number of branch lines indicated by the letters "number_of_lines" and further stores Reverb_Structure( ) for each branch line.

Furthermore, syntax for PreDelay_Configuration( ) illustrated in FIG. 13 is, for example, as illustrated in FIG. 15. In this example, as a pre-delay configuration information, PreDelay_Configuration( ) stores the number of pre-delay taps (number of pre-delays) indicated by the letters "number_of_predelays" and the number of early reflection taps (number of early reflections) indicated by the letters "number_of_earlyreflections".

Syntax for MultiTapDelay_Configuration( ) illustrated in FIG. 13 is, for example, as illustrated in FIG. 16. In this example, MultiTapDelay_Configuration( ) stores the number of multi-taps indicated by the letters "number_of_taps" as configuration information of multi-tap delay.

Moreover, syntax for AllPassFilter_Configuration( ) illustrated in FIG. 13 is, for example, as illustrated in FIG. 17. In this example, as configuration information of the all-pass filter, AllPassFilter_Configuration( ) stores the number of all-pass filter lines indicated by the letters "number_of_apf_lines" and the number of all-pass filter sections indicated by the letters "number_of_apf_units".

Syntax for CombFilter_Configuration( ) in FIG. 13 is, for example, as illustrated in FIG. 18. In this example, as configuration information of the comb filter, CombFilter_Configuration( ) stores the number of comb filter lines indicated by the letters "number_of_comb_lines" and the number of comb filter sections indicated by the letters "number_of_comb_sections".

Syntax for HighCut_Configuration( ) in FIG. 13 is, for example, as illustrated in FIG. 19. In this example, HighCut_Configuration( ) does not particularly include configuration information.

Furthermore, syntax for Reverb_Parameter( ) illustrated in FIG. 11 is, for example, as illustrated in FIG. 20.

In the example illustrated in FIG. 20, Reverb_Parameter ( ) stores coefficient information of a configuration element, or the like, indicated by the element ID (elem_id[ ]). Note that the elem_id[ ] in FIG. 20 is the one indicated by Reverb_Configuration( ) described above.

For example, in a case where the value for elem_id[ ] is "0", Branch_Parameters(n), which is coefficient information of a branch configuration element, is stored, and in a case where the value for elem_id[ ] is "1", PreDelay_Parameters ( ), which is coefficient information of pre-delay, is stored.

Furthermore, in a case where the value for elem_id[ ] is "2", AllPassFilter_Parameters( ), which is coefficient information of the all-pass filter, is stored, and in a case where the value for elem_id[ ] is "3", MultiTapDelay_Parameters( ), which is coefficient information of multi-tap delay, is stored.

Moreover, in a case where the value for elem_id[ ] is "4", CombFilter_Parameters( ), which is coefficient information of the comb filter, is stored, and in a case where the value for elem_id[ ] is "5", HighCut_Parameters( ), which is coefficient information of a high-range cut filter, is stored.

Here, Branch_Parameters (n), PreDelay_Parameters( ) AllPassFilter_Parameters( ), MultiTapDelay_Parameters( ) CombFilter_Parameters( ), and HighCut_Parameters( ) in which coefficient information is stored will be further described.

Syntax for Branch_Parameters(n) illustrated in FIG. 20 is, for example, as illustrated in FIG. 21. In this example, as coefficient information of branch configuration elements, Branch_Parameters(n) stores the gain value gain[i] by the number of branch lines number_of_lines, and further stores Reverb_Parameters(n) for each branch line.

Here, the gain value gain[i] indicates a gain value used in an amplification unit provided in the i-th branch line. For example, in the example in FIG. 9, the gain value gain[0] is a gain value used in the amplification unit 171 provided in the 0th branch line, that is, a branch line in a first line, and the gain value gain[1] is a gain value used in the amplification unit 172 provided in a branch line in a second line.

Furthermore, syntax for PreDelay_Parameters( ) illustrated in FIG. 20 is, for example, as illustrated in FIG. 22.

In the example illustrated in FIG. 22, as coefficient information of pre-delay, PreDelay_Parameters( ) stores the number of pre-delay samples predelay_sample[i] and a gain value for pre-delay predelay_gain[i], by the number of pre-delay taps number_of_predelays.

Here, the number of delay samples predelay_sample[i] indicates the number of delay samples for the i-th pre-delay, and the gain value predelay_gain[i] indicates a gain value for the i-th pre-delay. For example, in the example of FIG. 9, the number of delay samples predelay_sample[0] is the 0th pre-delay, that is, the number of delay samples of a Wet component signal supplied to the amplification unit 182-1, and the gain value predelay_gain[0] is a gain value used in the amplification unit 182-1.

Furthermore, PreDelay_Parameters( ) stores the number of delay samples of early reflection earlyref_sample[i] and the gain value for the early reflection earlyref_gain[i], by the number of early reflection taps number_of_earlyreflections.

Here, the number of delay samples earlyref_sample[i] indicates the number of delay samples for the i-th early reflection, and the gain value earlyref_gain[i] indicates the gain value for the i-th early reflection. For example, in the example in FIG. 9, the number of delay samples earlyref_sample[0] is the 0th early reflection, that is, the number of delay samples of a Wet component signal supplied to the amplification unit 185-1, and the gain value earlyref_gain[0] is a gain value used in the amplification unit 185-1.

Moreover, syntax for MultiTapDelay_Parameters( ) illustrated in FIG. 20 is, for example, as illustrated in FIG. 23.

In the example illustrated in FIG. 23, as coefficient information of multi-tap delay, MultiTapDelay_Parameters ( ) stores the number of delay samples of multi-tap delay delay_sample[i] and the gain value for multi-tap delay delay_gain[i], by the number of multi-taps number_of_taps. Here, the number of delay samples delay_sample[i] indicates the number of delay samples for the i-th delay, and the gain value delay_gain[i] indicates a gain value for the i-th delay.

Syntax for HighCut_Parameters( ) illustrated in FIG. 20 is, for example, as illustrated in FIG. 24.

In the example illustrated in FIG. 24, as coefficient information of a high-range cut filter, HighCut_Parameters ( ) stores a gain value gain for a high-range cut filter.

Moreover, syntax for AllPassFilter_Parameters( ) illustrated in FIG. 20 is, for example, as illustrated in FIG. 25.

In the example illustrated in FIG. 25, as coefficient information of the all-pass filter, AllPassFilter_Parameters ( ) stores the number of delay samples delay_sample[i][j] and the gain value gain[i][j] for each section by the number of all-pass filter sections number_of_apf_sections, for each line by the number of all-pass filter lines number_of_apf_lines.

Here, the number of delay samples delay_sample[i][j] indicates the number of delay samples at the j-th section of the i-th line (line) of the all-pass filter, and the gain value gain[i][j] is a gain value used in an amplification unit at the j-th section of the i-th line (line) of the all-pass filter.

For example, in the example in FIG. 9, the number of delay samples delay_sample[0][0] is the number of delay samples in the delay unit 222 at the 0th section of the 0th line, and the gain value gain[0][0] is a gain value used in the amplification unit 223 and the amplification unit 224 at the 0th section of the 0th line. Note that, in more detail, the gain value used in the amplification unit 223 and the gain value used in the amplification unit 224 have the same magnitude but are provided with different reference signs.

Syntax for CombFilter_Parameters( ) illustrated in FIG. 20 is, for example, as illustrated in FIG. 26.

In the example illustrated in FIG. 26, as coefficient information of the comb filter, CombFilter_Parameters( ) stores the number of delay samples delay_sample[i][j], the gain value gain_a[i][j], and the gain value gain_b[i][j] for each section by the number of comb filter sections number_of_comb_sections, for each line by the number of comb filter lines number_of_comb_lines.

Here, the number of delay samples delay_sample[i][j] indicates the number of delay samples at the j-th section of the i-th line (line) of the comb filter, and the gain value gain_a[i][j] and the gain value gain_b[i][j] are gain values used in an amplification unit at the j-th section of the i-th line (line) of the comb filter.

For example, in the example in FIG. 9, the number of delay samples delay_sample[0][0] is the number of delay samples in the delay unit 202-1 at the 0th section of the 0th line. Furthermore, the gain value gain_a[0][0] is a gain value used in the amplification unit 203-1 at the 0th section of the 0th line, and the gain value gain_b[0][0] is a gain value used in the amplification unit 204-1 at the 0th section of the 0th line.

In a case where the parametric reverb of the reverb processing unit 141 is reconstructed (reconfigured) by the above-described meta information, the meta information is as illustrated in FIG. 27, for example. Note that, although coefficient values in Reverb_Parameters( ) are represented by X for an integer and X.X for a floating-point number here, values set according to a used reverb parameter are actually input.

In the example illustrated in FIG. 27, in the part of Branch_Configuration( ), the value “2”, which is a value for the number of branch lines number_of_lines in the branch output unit 151, is stored.

Furthermore, in the part of PreDelay_Configuration( ) the value “3”, which is a value for the number of pre-delay taps number_of_predelays in the pre-delay unit 152, and the value “2”, which is a value for the number of early reflection taps number_of_earlyreflections in the pre-delay unit 152, are stored.

In the part of CombFilter_Configuration( ), the value “3”, which is a value for the number of comb filter lines number_of_comb_lines in the comb filter unit 153, and the value “1”, which is a value for the number of comb filter sections number_of_comb_sections in the comb filter unit 153, are stored.

Moreover, in the part of AllPassFilter_Configuration( ), the value “1”, which is a value for the number of all-pass filter lines number_of_apf_lines in the all-pass filter unit 154, and the value “2”, which is a value for the number of all-pass filter sections number_of_apf_sections in the all-pass filter unit 154, are stored.

Furthermore, in the part of Branch Parameter(0) in Reverb_Parameter(0), the gain value gain[0] used in the amplification unit 171 of the 0th branch line of the branch output unit 151 is stored, and in the part of Reverb_Parameter(1), the gain value gain[1] used in the amplification unit 172 of a first branch line of the branch output unit 151 is stored.

In the part of PreDelay_Parameters( ), the number of pre-delay samples predelay_sample[0], the number of delay samples predelay_sample[1], and the number of delay samples predelay_sample[2], which are for pre-delay in the pre-delay processing unit 181 in the pre-delay unit 152, are stored.

Here, the number of delay samples predelay_sample[0], the number of delay samples predelay_sample[1], and the number of delay samples predelay_sample[2] are delay times of Wet component signals that the pre-delay processing unit 181 supplies to the amplification unit 182-1 to the amplification unit 182-3, respectively.

Furthermore, in the part of PreDelay_Parameters( ) the gain value predelay_gain[0], the gain value predelay_gain [1], and the gain value predelay_gain[2], which are used in the amplification unit 182-1 to the amplification unit 182-3 respectively, are also stored.

In the part of PreDelay_Parameters( ), the number of delay samples earlyref_sample[0] and the number of delay samples earlyref_sample[1], which are for early reflection in the pre-delay processing unit 181 in the pre-delay unit 152, are stored.

These number of delay samples earlyref_sample[0] and number of delay samples earlyref_sample[1] are delay times of Wet component signals that the pre-delay processing unit 181 supplies to the amplification unit 185-1 and the amplification unit 185-2, respectively.

Moreover, in the part of PreDelay_Parameters( ), the gain value earlyref_gain[0] and the gain value earlyref_gain[1], which are used in the amplification unit 185-1 and the amplification unit 185-2 respectively, are also stored.

In the part of CombFilter_Parameters( ), the number of delay samples delay_sample[0][0] in the delay unit 202-1, the gain value gain_a[0][0] for obtaining a gain value used in the amplification unit 203-1, and the gain value gain_b [0][0] for obtaining a gain value used in the amplification unit 204-1 are stored.

Furthermore, in the part of CombFilter_Parameters( ), the number of delay samples delay_sample[1][0] in the delay unit 202-2, the gain value gain_a[1][0] for obtaining a gain value used in an amplification unit 203-2, and the gain value gain_b[1][0] for obtaining a gain value used in the amplification unit 204-2 are stored.

Moreover, in the part of CombFilter_Parameters( ), the number of delay samples delay_sample[2][0] in the delay unit 202-3, the gain value gain_a[2][0] for obtaining a gain value used in the amplification unit 203-3, and the gain value gain_b[2][0] for obtaining a gain value used in the amplification unit 204-3 are stored.

In the part of AllPassFilter_Parameters( ), the number of delay samples delay_sample[0][0] in the delay unit 222 and the gain value gain[0][0] for obtaining a gain value used in the amplification unit 223 and the amplification unit 224 are stored.

Furthermore, in the part of AllPassFilter_Parameters( ), the number of delay samples delay_sample[0][1] in the delay unit 226 and the gain value gain[0][1] for obtaining a gain value used in the amplification unit 227 and the amplification unit 228 are stored.

On the reproduction side (signal processing device 131 side), the configuration of the reverb processing unit 141 can be reconstructed on the basis of the configuration information and coefficient information of each configuration element described above.

<Description of Audio Signal Output Processing>

Figure 28:
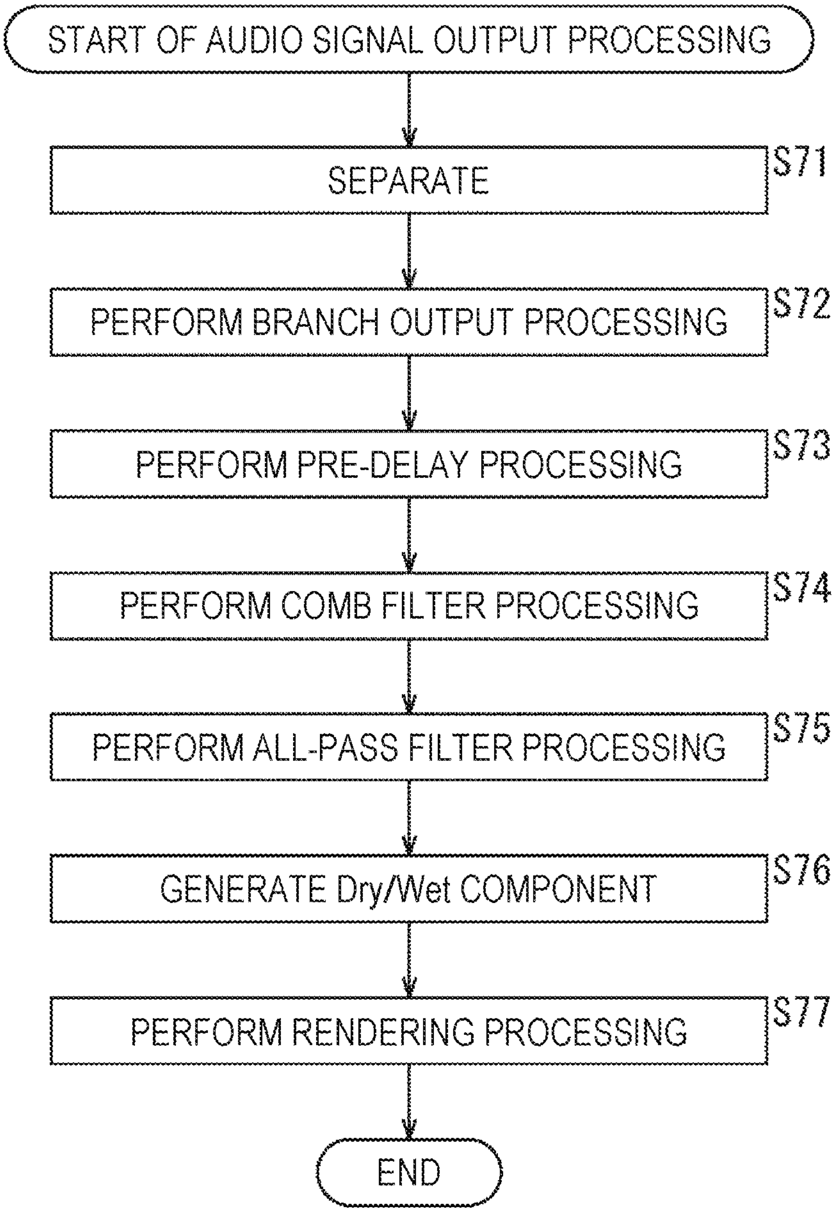
FIG. 28 is a flowchart describing audio signal output processing.

Next, operation of the signal processing device 131 illustrated in FIG. 9 will be described. That is, audio signal output processing by the signal processing device 131 will be described below with reference to the flowchart in FIG. 28.

Note that, because the processing in step S71 is similar to the processing in step S11 in FIG. 5, description of the processing in step S71 will be omitted. However, in step S71, the reverb parameter illustrated in FIG. 27 is read from the bitstream by the demultiplexer 21 and supplied to the reverb processing unit 141 and the VBAP processing unit 23.

In step S72, the branch output unit 151 performs branch output processing on the object audio data supplied from the demultiplexer 21.

That is, the amplification unit 171 and the amplification unit 172 perform gain adjustment of the object audio data on the basis of the supplied gain value, and supplies the object audio data obtained as a result to the addition unit 156 and the pre-delay processing unit 181.

In step S73, the pre-delay unit 152 performs pre-delay processing on the object audio data supplied from the amplification unit 172.

That is, the pre-delay processing unit 181 delays the object audio data supplied from the amplification unit 172 by the number of delay samples according to an output destination, and then supplies the object audio data to the amplification unit 182 and the amplification unit 185.

The amplification unit 182 performs gain adjustment on the object audio data supplied from the pre-delay processing unit 181 on the basis of the supplied gain value and supplies the object audio data to the addition unit 183 or the addition unit 184, and the addition unit 183 and the addition unit 184 perform addition processing of the supplied object audio data. When the Wet component signal is obtained in this manner, the addition unit 184 supplies the obtained Wet component signal to the addition unit 201 of the comb filter unit 153.

Furthermore, the amplification unit 185 performs gain adjustment on the object audio data supplied from the pre-delay processing unit 181 on the basis of the supplied gain value, and supplies the Wet component signal obtained as a result to the addition unit 155.

In step S74, the comb filter unit 153 performs comb filter processing.

That is, the addition unit 201 adds the Wet component signal supplied from the addition unit 184 and the Wet component signal supplied from the amplification unit 203, and supplies the obtained result to the delay unit 202. The delay unit 202 delays the Wet component signal supplied from the addition unit 201 by the supplied number of delay samples, and then supplies the Wet component signal to an amplification unit 203 and an amplification unit 204.

The amplification unit 203 performs gain adjustment on the Wet component signal supplied from the delay unit 202 on the basis of the supplied gain value and supplies the Wet component signal to the addition unit 201, and the amplification unit 204 performs gain adjustment on the Wet component signal supplied from the delay unit 202 on the basis of the supplied gain value and supplies the Wet component signal to the addition unit 205 or the addition unit 206. The addition unit 205 and the addition unit 206 perform addition processing of the supplied Wet component signal, and the addition unit 206 supplies the obtained Wet component signal to the addition unit 221 of the all-pass filter unit 154.

In step S75, the all-pass filter unit 154 performs all-pass filter processing. That is, the addition unit 221 adds the Wet component signal supplied from the addition unit 206 and the Wet component signal supplied from the amplification unit 223, and supplies the obtained result to the delay unit 222 and the amplification unit 224.

The delay unit 222 delays the Wet component signal supplied from the addition unit 221 by the supplied number of delay samples, and then supplies the Wet component signal to the amplification unit 223 and the addition unit 225.

The amplification unit 224 performs gain adjustment on the Wet component signal supplied from the addition unit 221 on the basis of the supplied gain value, and supplies the Wet component signal to the addition unit 225. The amplification unit 223 performs gain adjustment on the Wet component signal supplied from the delay unit 222 on the basis of the supplied gain value, and supplies the Wet component signal to the addition unit 221.

The addition unit 225 adds the Wet component signal supplied from the delay unit 222, the Wet component signal supplied from the amplification unit 224, and the Wet component signal supplied from the amplification unit 227, and supplies the obtained result to the delay unit 226 and the amplification unit 228.

Furthermore, the delay unit 226 delays the Wet component signal supplied from the addition unit 225 by the supplied number of delay samples, and then supplies the Wet component signal to the amplification unit 227 and the addition unit 229.

The amplification unit 228 performs gain adjustment on the Wet component signal supplied from the addition unit 225 on the basis of the supplied gain value, and supplies the Wet component signal to the addition unit 229. The amplification unit 227 performs gain adjustment on the Wet component signal supplied from the delay unit 226 on the basis of the supplied gain value, and supplies the Wet component signal to the addition unit 225. The addition unit 229 adds the Wet component signal supplied from the delay unit 226 and the Wet component signal supplied from the amplification unit 228, and supplies the obtained result to the addition unit 156.

In step S76, the addition unit 156 generates a Dry/Wet component signal.

That is, the addition unit 155 adds the Wet component signal supplied from the amplification unit 185-1 and the Wet component signal supplied from the amplification unit 185-2, and supplies the obtained result to the addition unit 156. The addition unit 156 adds the object audio data supplied from the amplification unit 171, the Wet component signal supplied from the addition unit 229, and the Wet component signal supplied from the addition unit 155, and supplies the signal obtained as a result, as a Dry/Wet component signal, to the VBAP processing unit 23.

After the processing in step S76 is performed, the processing in step S77 is performed, and the audio signal output processing ends. However, because the processing in step S77 is similar to the processing in step S13 in FIG. 5, description of the processing in step S77 will be omitted.

As described above, the signal processing device 131 performs reverb processing on the object audio data on the basis of the reverb parameter including configuration information and coefficient information and generates a Dry/Wet component.

With this arrangement, it is possible to implement distance feeling control more effectively on a reproduction side of the object audio data. In particular, by performing reverb processing using a reverb parameter including configuration information and coefficient information, encoding efficiency can be improved as compared with a case where an impulse response is used as a reverb parameter.

The method indicated in the above-described third embodiment shows that configuration information and coefficient information of parametric reverb are used as meta information. In other words, it can be said that parametric reverb can be reconstructed on the basis of on the meta information. That is, parametric reverb used at a time of content creation can be reconstructed on the reproduction side on the basis of the meta information.

In particular, according to the present method, reverb processing using an algorithm having any configuration can be applied on the content production side. Furthermore, distance feeling control is possible with meta information having a relatively small data amount. Then, a distance feeling can be reproduced as a content creator intends by performing reverb processing according to the meta information on the audio object in rendering on the reproduction side. Note that, in an encoding device, the meta information or position information indicated in FIG. 11 and a bitstream storing encoded object audio data are generated.

First Modification of Third Embodiment

<Configuration Example of Signal Processing Device>

Note that, as described above, configuration of parametric reverb can be any configuration. That is, various reverb algorithms can be configured by combining other any configuration elements.

For example, parametric reverb can be configured by combining a branch configuration element, pre-delay, multi-tap delay, and an all-pass filter.

Figure 29:
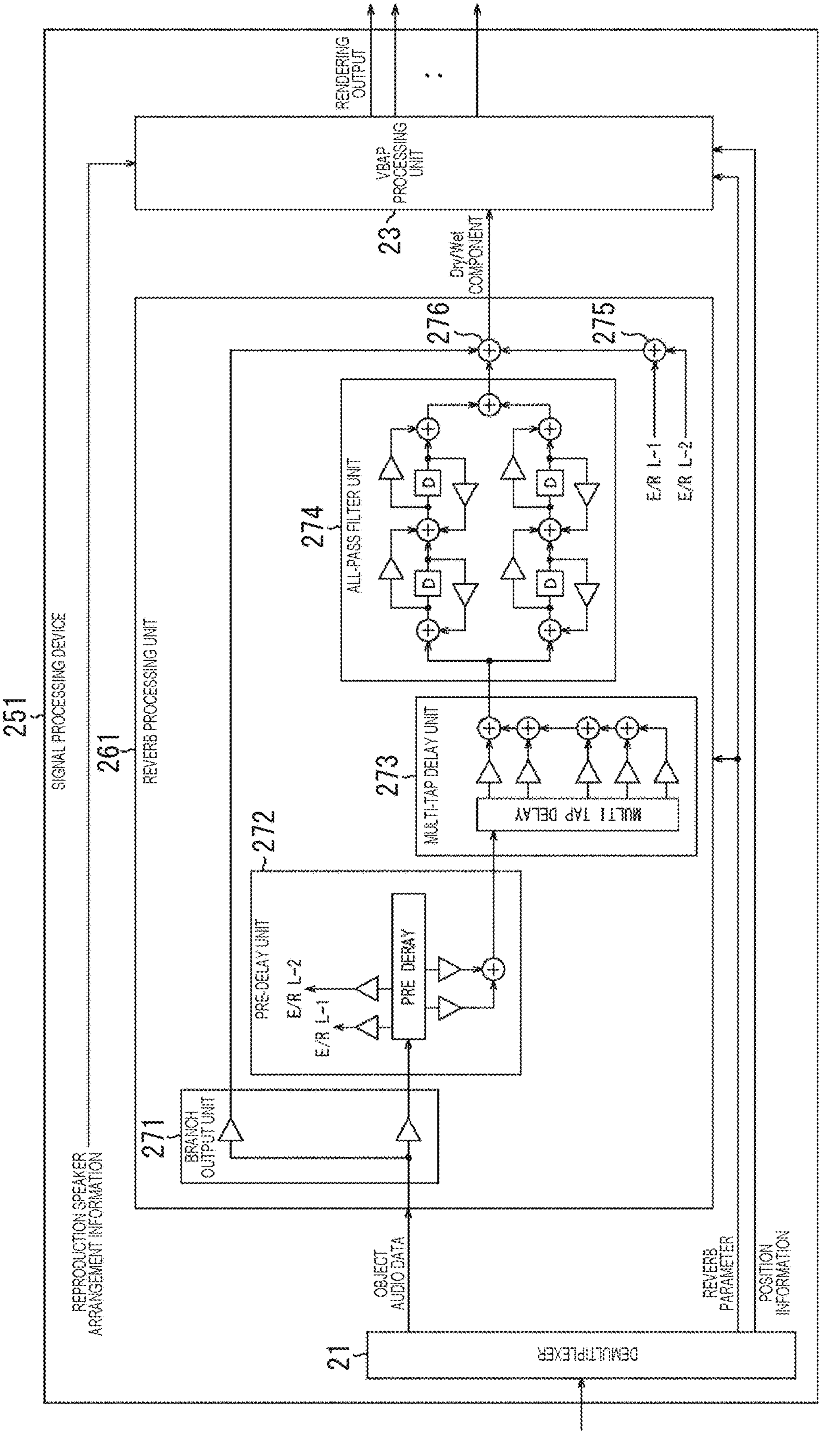
FIG. 29 is a diagram illustrating a configuration example of a signal processing device.

In such a case, a signal processing device is configured as illustrated in FIG. 29, for example. Note that, in FIG. 29, the parts corresponding to the parts in FIG. 1 are provided with the same reference signs, and description of the corresponding parts will be omitted as appropriate.

A signal processing device 251 illustrated in FIG. 29 includes the demultiplexer 21, a reverb processing unit 261, and the VBAP processing unit 23.

Configuration of this signal processing device 251 is different from configuration of the signal processing device 11 in that the reverb processing unit 261 is provided instead of the reverb processing unit 22 of the signal processing device 11 in FIG. 1, and otherwise, the configuration of the signal processing device 251 is similar to the configuration of the signal processing device 11.

The reverb processing unit 261 generates a Dry/Wet component signal by performing reverb processing on the object audio data supplied from the demultiplexer 21 on the basis of the reverb parameter supplied from the demultiplexer 21, and supplies the Dry/Wet component signal to the VBAP processing unit 23.

In this example, the reverb processing unit 261 includes a branch output unit 271, a pre-delay unit 272, a multi-tap delay unit 273, an all-pass filter unit 274, an addition unit 275, and an addition unit 276.

The branch output unit 271 branches the object audio data supplied from the demultiplexer 21, performs gain adjustment, and supplies the object audio data to the addition unit 276 and the pre-delay unit 272. In this example, the number of branch lines of the branch output unit 271 is 2.

The pre-delay unit 272 performs pre-delay processing, which is similar to the pre-delay processing in the pre-delay unit 152, on the object audio data supplied from the branch output unit 271, and supplies the obtained Wet component signal to the addition unit 275 and the multi-tap delay unit 273. In this example, the number of pre-delay taps and the number of early reflection taps in the pre-delay unit 272 are 2.

The multi-tap delay unit 273 delays and branches the Wet component signal supplied from the pre-delay unit 272, performs gain adjustment, adds the Wet components obtained as a result to combine into one signal, and then supplies the signal to the all-pass filter unit 274. Here, the number of multi-taps in the multi-tap delay unit 273 is 5.

The all-pass filter unit 274 performs all-pass filter processing, which is similar to the all-pass filter processing in the all-pass filter unit 154, on the Wet component signal supplied from the multi-tap delay unit 273, and supplies the obtained Wet component signal to the addition unit 276. Here, the all-pass filter unit 274 is a two-line, two-section all-pass filter.

The addition unit 275 adds the two Wet component signals supplied from the pre-delay unit 272 and supplies the obtained result to the addition unit 276. The addition unit 276 adds the object audio data supplied from the branch output unit 271, the Wet component signal supplied from the all-pass filter unit 274, and the Wet component signal supplied from the addition unit 275, and supplies the obtained signal, as a Dry/Wet component signal, to the VBAP processing unit 23.

In a case where the reverb processing unit 261 has the configuration illustrated in FIG. 29, the reverb processing unit 261 is supplied with, for example, the meta information (reverb parameters) illustrated in FIG. 30.

In the example illustrated in FIG. 30, number_of_lines, number_of_pre-delays, number_of_earlyreflections, number_of_taps, number_of_apf_lines, and number_of_apf_units are stored as configuration information in the meta information.

Furthermore, in the meta information, as coefficient information, gain[0] and gain[1] of branch configuration elements, predelay_sample[0], predelay_gain[0], predelay_sample[1], and predelay_gain[1] of pre-delay, and earlyref_sample[0], earlyref_gain[0], earlyref_sample[1], and earlyref_gain[1] of early reflection are stored.

Moreover, as coefficient information, delay_sample[0], delay_gain[0], delay_sample[1], delay_gain[1], delay_sample[2], delay_gain[2], delay_sample[3], delay_gain[3], delay_sample[4], and delay_gain[4] of multi-tap delay, and delay_sample[0][0], gain[0][0], delay_sample[0][1], gain[0][1], delay_sample[1][0], gain[1][0], delay_sample[1][1], and gain[1][1] of the all-pass filter are stored.

As described above, according to the present technology, in rendering object-based audio, it is possible to more effectively implement distance feeling control by meta information.

In particular, according to the first embodiment and the third embodiment, it is possible to implement distance feeling control with relatively less parameters.

Furthermore, according to the second embodiment and the third embodiment, it is possible to add reverberation as desired or intended by a creator in content creation. That is, reverb processing can be selected without being restricted by an algorithm.

Moreover, according to the third embodiment, it is possible to reproduce a reverb effect as desired or intended by a content creator without using an enormous impulse response in rendering the object-based audio.

<Configuration Example of Computer>

By the way, the above-described series of processing can be executed by hardware or can be executed by software. In a case where a series of processing is executed by software, a program constituting the software is installed on the computer. Here, the computer includes, a computer incorporated in dedicated hardware, a general-purpose personal computer for example, which is capable of executing various kinds of functions by installing various programs, or the like.

Figure 31:
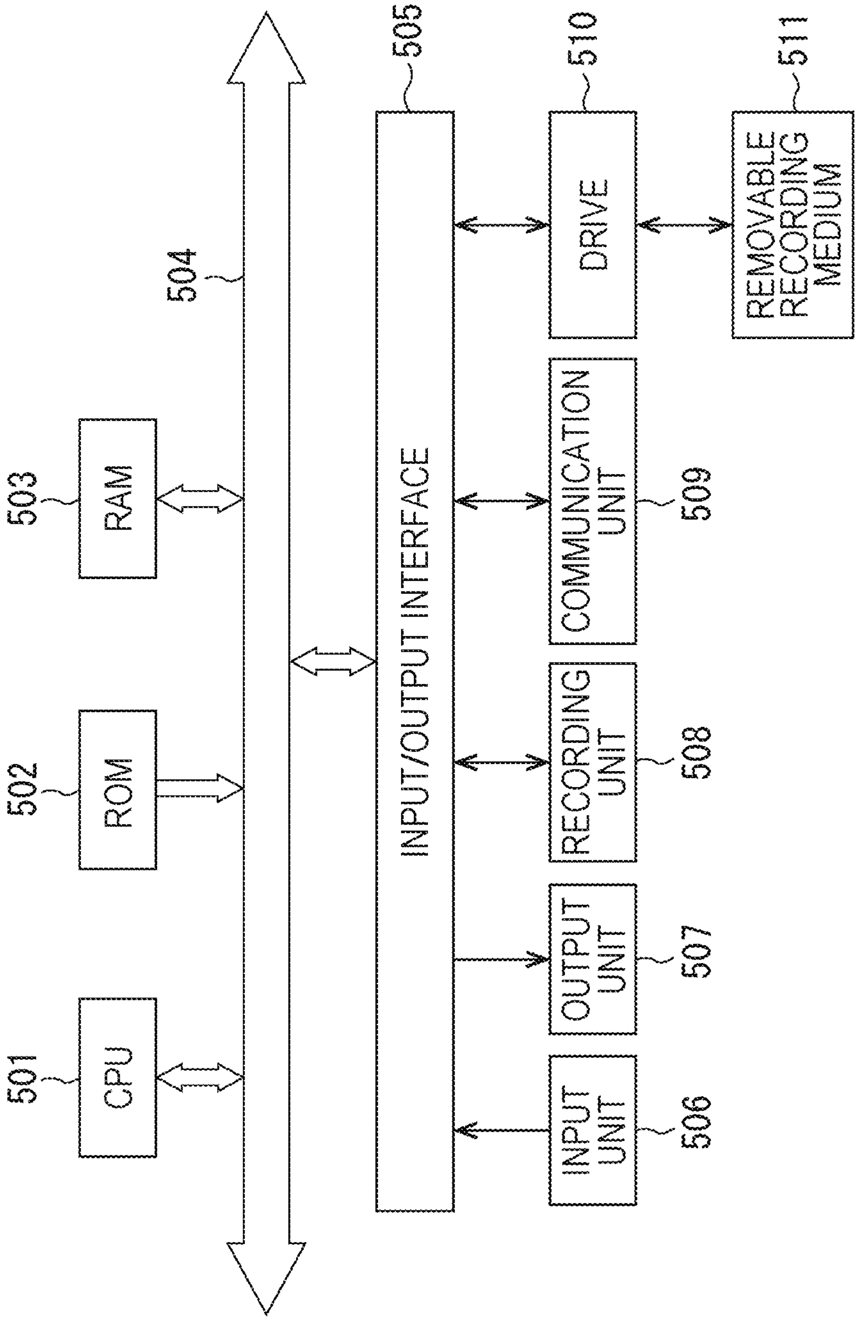
FIG. 31 is a diagram illustrating a configuration example of a computer.

FIG. 31 is a block diagram illustrating a configuration example of hardware of a computer that executes the series of processing described above by a program.

In the computer, a central processing unit (CPU) 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, or the like. The output unit 507 includes a display, a speaker, or the like. The recording unit 508 includes a hard disk, a non-volatile memory, or the like. The communication unit 509 includes a network interface, or the like. The drive 510 drives a removable recording medium 511 such as a magnetic disk, an optical disk, a magneto-optical disk, or a semiconductor memory.

In the computer configured as above, the series of processing described above is executed by the CPU 501 loading, for example, a program recorded in the recording unit 508 to the RAM 503 via the input/output interface 505 and the bus 504 and executing the program.

A program executed by the computer (CPU 501) can be provided by being recorded on the removable recording medium 511 as a package medium, or the like, for example. Furthermore, the program can be provided via a wired or wireless transmission medium such as a local area network, the Internet, or digital satellite broadcasting.

In the computer, the program can be installed on the recording unit 508 via the input/output interface 505 by attaching the removable recording medium 511 to the drive 510. Furthermore, the program can be received by the communication unit 509 via the wired or wireless transmission medium and installed on the recording unit 508. In addition, the program can be installed on the ROM 502 or the recording unit 508 in advance.

Note that, the program executed by the computer may be a program that is processed in time series in an order described in this specification, or a program that is processed in parallel or at a necessary timing such as when a call is made.

Furthermore, embodiments of the present technology are not limited to the above-described embodiments, and various changes can be made without departing from the scope of the present technology.

For example, the present technology can have a configuration of cloud computing in which one function is shared and processed jointly by a plurality of devices via a network.

Furthermore, each step described in the above-described flowchart can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

Moreover, the present technology may have the following configurations.

(1)

A signal processing device including a reverb processing unit that generates a signal of a reverb component on the basis of object audio data of an audio object and a reverb parameter for the audio object.

(2)

The signal processing device according to (1), further including a rendering processing unit that performs rendering processing on the signal of the reverb component on the basis of the reverb parameter.

(3)

The signal processing device according to (2), in which the reverb parameter includes position information indicating a localization position of a sound image of the reverb component, and the rendering processing unit performs the rendering processing on the basis of the position information.

(4)

The signal processing device according to (3), in which the position information includes information indicating an absolute localization position of the sound image of the reverb component.

(5)

The signal processing device according to (3), in which the position information includes information indicating a relative localization position, with respect to the audio object, of the sound image of the reverb component.

(6)

The signal processing device according to any one of (1) to (5), in which the reverb parameter includes an impulse response, and the reverb processing unit generates the signal of the reverb component on the basis of the impulse response and the object audio data.

(7)

The signal processing device according to any one of (1) to (5), in which the reverb parameter includes configuration information that indicates configuration of parametric reverb, and the reverb processing unit generates the signal of the reverb component on the basis of the configuration information and the object audio data.

(8)

The signal processing device according to (7), in which the parametric reverb includes a plurality of configuration elements including one or a plurality of filters.

(9)

The signal processing device according to (8), in which the filter includes a low-pass filter, a comb filter, an all-pass filter, or multi-tap delay.

(10)

The signal processing device according to (8) or (9), in which the reverb parameter includes a parameter used in processing by the configuration element.

(11)

A signal processing method including, by a signal processing device, generating a signal of a reverb component on the basis of object audio data of an audio object and a reverb parameter for the audio object.

(12)

A program for causing a computer to execute processing including a step of generating a signal of a reverb component on the basis of object audio data of an audio object and a reverb parameter for the audio object.

REFERENCE SIGNS LIST

11 Signal processing device
21 Demultiplexer
22 Reverb processing unit
23 VBAP processing unit
61 Reverb processing unit
141 Reverb processing unit
151 Branch output unit
152 Pre-delay unit
153 Comb filter unit
154 All-pass filter unit
155 Addition unit
156 Addition unit

The invention claimed is:

1. A signal processing device comprising:

processing circuitry configured to:

generate a signal of a reverb component on a basis of object audio data of an audio object and a reverb parameter for the audio object; and perform rendering processing by using vector based amplitude panning (VBAP) processing of the signal of the reverb component on a basis of the reverb parameter, wherein the reverb parameter includes position information indicating a localization position of a sound image of the reverb component, and the processing circuitry is configured to perform the rendering processing on a basis of the position information.

2. The signal processing device according to claim 1, wherein the position information includes information indicating an absolute localization position of the sound image of the reverb component.

3. The signal processing device according to claim 1, wherein the position information includes information indicating a relative localization position, with respect to the audio object, of the sound image of the reverb component.

4. The signal processing device according to claim 1, wherein the reverb parameter includes an impulse response, and the processing circuitry is configured to generate the signal of the reverb component on a basis of the impulse response and the object audio data.

5. The signal processing device according to claim 1, wherein the reverb parameter includes configuration information that indicates a parametric reverb configuration, and the processing circuitry is configured to generate the signal of the reverb component on a basis of the configuration information and the object audio data.

6. The signal processing device according to claim 5, wherein the parametric reverb includes a plurality of configuration elements including one or a plurality of filters.

7. The signal processing device according to claim 6, wherein the filter includes a low-pass filter, a comb filter, an all-pass filter, or a multi-tap delay.

8. The signal processing device according to claim 7, wherein the reverb parameter includes a parameter used in processing by the configuration elements.

9. The signal process device according to claim 1, wherein the reverb parameter includes a pre-delay delay time that indicates a delay time to when reflection sound or reverberation sound other than early reflection sound is first heard relative to a time when direct sound is heard and an early reflection delay time that indicates a delay time to when early reflection sound is heard.

10. A signal processing method comprising, by a signal processing device:

generating a signal of a reverb component on a basis of object audio data of an audio object and a reverb parameter for the audio object; and performing rendering processing by using vector based amplitude panning (VBAP) processing of the signal of the reverb component on a basis of the reverb parameter, wherein the reverb parameter includes position information indicating a localization position of a sound image of the reverb component, and the rendering processing is performed on a basis of the position information.

11. The signal process method according to claim 10, wherein the position information includes information indicating an absolute localization position of the sound image of the reverb component.

12. The signal processing method according to claim 10, wherein the position information includes information indicating a relative localization position, with respect to the audio object, of the sound image of the reverb component.

13. The signal processing method according to claim 10, wherein the reverb parameter includes an impulse response, and p1 the processing circuitry is configured to generate the signal of the reverb component on a basis of the impulse response and the object audio data.

14. The signal processing method according to claim 10, wherein the reverb parameter includes configuration information that indicates a parametric reverb configuration, and the processing circuitry is configured to generate the signal of the reverb component on a basis of the configuration information and the object audio data.

15. The signal processing method according to claim 14, wherein the parametric reverb includes a plurality of configuration elements including one or a plurality of filters.

16. The signal processing method according to claim 15, wherein the filter includes a low-pass filter, a comb filter, an all-pass filter, or a multi-tap delay.

17. The signal processing method according to claim 16, wherein the reverb parameter includes a parameter used in processing by the configuration elements.

18. The signal processing method according to claim 10, wherein the reverb parameter includes a pre-delay delay time that indicates a delay time to when reflection sound or reverberation sound other than early reflection sound is first heard relative to a time when direct sound is heard and an early reflection delay time that indicates a delay time to when early reflection sound is heard.

19. A non-transitory computer readable medium storing instructions that, when executed by processing circuitry, perform a signal processing method comprising:

generating a signal of a reverb component on a basis of object audio data of an audio object and a reverb parameter for the audio object; and performing rendering processing by using vector based amplitude panning (VBAP) processing of the signal of the reverb component on a basis of the reverb parameter, wherein the reverb parameter includes position information indicating a localization position of a sound image of the reverb component, and the rendering processing is performed on a basis of the position information.

* * * * *